(12) United States Patent
Matsumoto et al.

(10) Patent No.: US 9,317,665 B2
(45) Date of Patent: Apr. 19, 2016

(54) SERVICE MANAGEMENT APPARATUS, PROGRAM, AND SERVICE MANAGEMENT METHOD

(71) Applicant: Clarion Co., Ltd., Saitama-shi, Saitama (JP)

(72) Inventors: Takashi Matsumoto, Tokyo (JP); Hideomi Watanabe, Saitama (JP); Hiroyoshi Endo, Kawaguchi (JP); Atsushi Shimizu, Tokyo (JP); Takaaki Sekiguchi, Tokyo (JP)

(73) Assignee: Clarion Co., Ltd., Saitama-shi (JP)

(*) Notice: Subject to any disclaimer, the term of this patent is extended or adjusted under 35 U.S.C. 154(b) by 0 days.

(21) Appl. No.: 14/104,587

(22) Filed: Dec. 12, 2013

(65) Prior Publication Data
US 2014/0182001 A1    Jun. 26, 2014

(30) Foreign Application Priority Data
Dec. 26, 2012  (JP) ................................ 2012-283157

(51) Int. Cl.
*G06F 21/00*  (2013.01)
*G06F 21/10*  (2013.01)

(52) U.S. Cl.
CPC .............. *G06F 21/105* (2013.01); *G06F 21/10* (2013.01)

(58) Field of Classification Search
CPC . G06F 21/10; G06F 21/105; G11B 20/00086; G11B 20/0021
USPC ........................................................ 726/31
See application file for complete search history.

(56) References Cited

U.S. PATENT DOCUMENTS

| | | |
|---|---|---|
| 8,719,956 B2 * | 5/2014 | Huang et al. ..................... 726/31 |
| 2007/0172065 A1* | 7/2007 | Lee et al. ........................ 380/259 |
| 2008/0148363 A1 | 6/2008 | Gilder et al. |
| 2010/0217974 A1* | 8/2010 | Fujimoto et al. .............. 713/155 |

FOREIGN PATENT DOCUMENTS

| | | |
|---|---|---|
| EP | 1 775 668 A1 | 4/2007 |
| JP | 2003-173381 A | 6/2003 |
| WO | WO 2008/012699 A1 | 1/2008 |

OTHER PUBLICATIONS

Extended European Search Report dated Apr. 2, 2014 (9 pages).
"Digital rights management" Wikipedia, the free encyclopedia, edited on Dec. 22, 2012, 30 pages.

* cited by examiner

*Primary Examiner* — Ali Abyaneh
*Assistant Examiner* — Narciso Victoria
(74) *Attorney, Agent, or Firm* — Crowell & Moring LLP

(57) ABSTRACT

A service management apparatus is provided that allows management of a shared license among devices, including a user storage unit storing a user and at least one associated terminal; a license information storage unit storing a license including a terminal to be permitted to use a predetermined service and license information for identifying a setting limitation; a setting request reception unit receiving a setting request for the license including information for identifying the terminal that has issued the setting request and the user; an associated terminal identification processing unit identifying the terminal that is associated with the user included in the request; a license identification processing unit identifying the license that each terminal to be identified is permitted to use and is settable to the terminal that has issued the request; and a license setting processing unit setting the identified license to the terminal that has issued the request.

7 Claims, 19 Drawing Sheets

Fig.3

USER ID STORAGE UNIT 262

| USER ID | USER AUTHENTICATION INFORMATION | NAME | FIRST OWNED TERMINAL ID | SECOND OWNED TERMINAL ID | ... | N-TH OWNED TERMINAL ID |
|---|---|---|---|---|---|---|
| 262A | 262B | 262C | 262D | 262E | | 262F |
| | | | | | | |

Fig.4

TERMINAL LICENSE INFORMATION STORAGE UNIT 263

| LICENSE ID | LICENSEE TERMINAL ID | SERVICE ID | START DATE | EXPIRATION DATE | MAXIMUM SETTING COUNT | COPYING PROPRIETY | MOVEMENT PROPRIETY |
|---|---|---|---|---|---|---|---|
| 263A | 263B | 263C | 263D | 263E | 263F | 263G | 263H |
|  |  |  |  |  |  |  |  |

TERMINAL AUTHENTICATION INFORMATION STORAGE UNIT 400

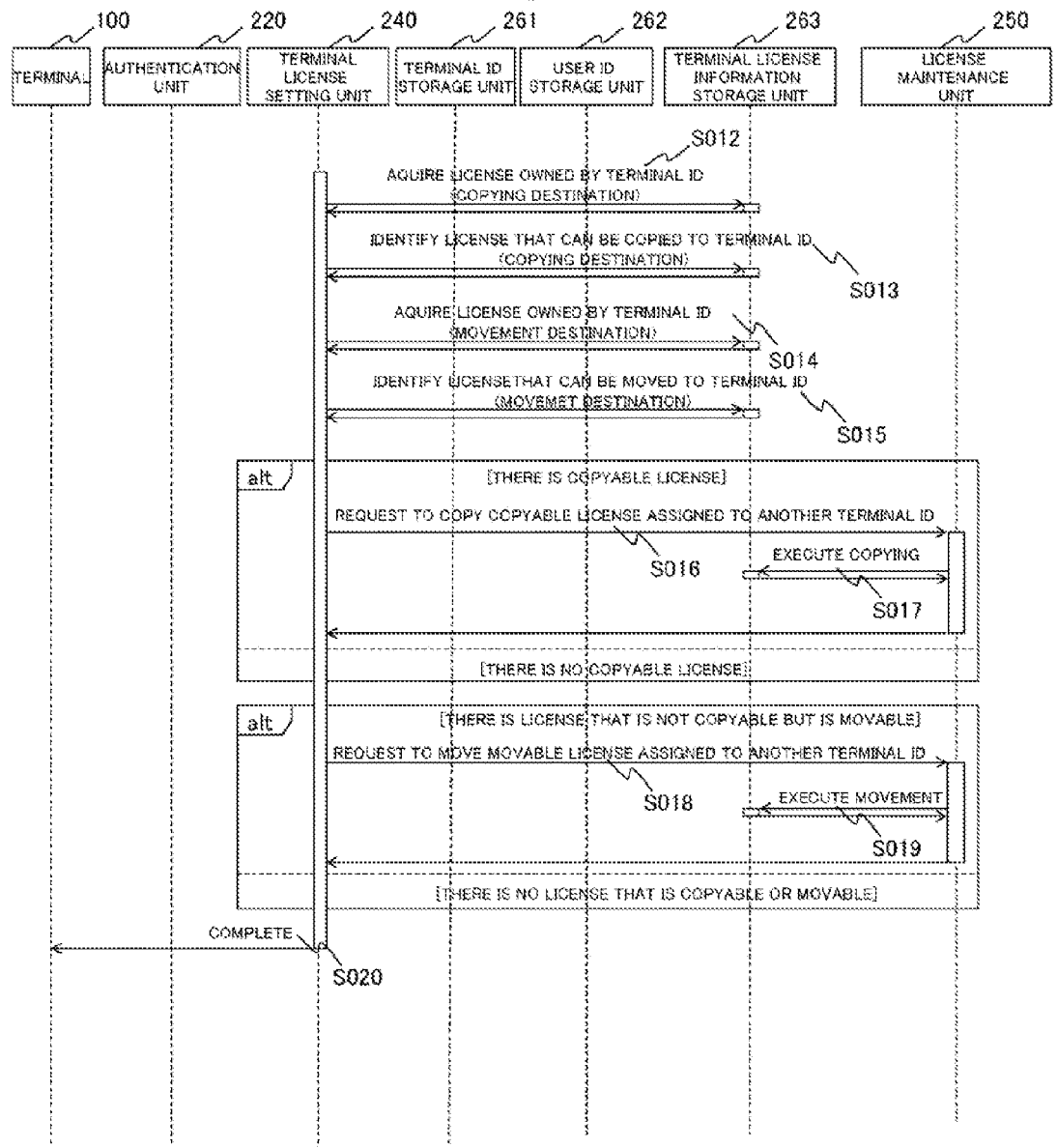

Fig.10

TERMINAL ID STORAGE UNIT /261

| 261A | 261B | 261C | 261D | 261E | 261F |
|---|---|---|---|---|---|
| TERMINAL ID | MODEL CODE | TERMINAL AUTHENTICATION INFORMATION | OWNER USER ID | USAGE START DATE | USAGE STATUS |
| 001 | 1A | XXXX | A | 2011/1/2 | IN USE |
| 002 | 1A | YYYY | B | 2011/1/2 | BEING TRANSFERRED |
| 003 | 1B | XYXY | C | 2011/1/3 | STOLEN |
| 004 | 1B | ZZZZ | A | 2012/1/4 | IN USE |
| 005 | 2A | ZYXY | NOT REGISTERED | NOT REGISTERED | NOT REGISTERED |
| ... | ... | ... | ... | ... | ... |

USER ID STORAGE UNIT /262

| 262A | 262B | 262C | 262D | 262E | |
|---|---|---|---|---|---|
| USER ID | USER AUTHENTICATION INFORMATION | NAME | FIRST OWNED TERMINAL ID | SECOND OWNED TERMINAL ID | ... |
| A | AAAA | AA | 001 | 004 | ... |
| B | BBBB | BB | 002 | NOT REGISTERED | ... |
| ... | ... | ... | ... | ... | ... |

TERMINAL LICENSE INFORMATION STORAGE UNIT /263

| 263A | 263B | 263C | 263D | 263E | 263F | 263G | 263H |
|---|---|---|---|---|---|---|---|
| LICENSE ID | LICENSEE TERMINAL ID | SERVICE ID | START DATE | EXPIRATION DATE | MAXIMUM SETTING COUNT | COPYING PROPRIETY | MOVEMENT PROPRIETY |
| 111 | 001 | A01 | 2011/1/2 | 2021/1/1 | UNLIMITED | COPYABLE | NON-MOVABLE |
| 112 | 001→004 | B05 | 2011/1/2 | UNLIMITED | 5 | NON-COPYABLE | MOVABLE |
| 113 | 001 | B13 | 2012/1/2 | 2014/1/2 | UNLIMITED | COPYABLE | NON-MOVABLE |
| 114 | 002 | A01 | 2011/1/3 | 2021/1/2 | UNLIMITED | COPYABLE | NON-MOVABLE |
| 115 | 003 | BX7 | 2012/4/4 | UNLIMITED | UNLIMITED | NON-COPYABLE | NON-MOVABLE |
| 116 | 004 | A01 | 2012/1/4 | 2022/1/3 | UNLIMITED | COPYABLE | NON-MOVABLE |
| 117 | 005 | ZAX | 2012/5/2 | UNLIMITED | 1 | NON-COPYABLE | NON-MOVABLE |
| 118 | 004 | B13 | 2012/1/2 | 2014/1/2 | UNLIMITED | COPYABLE | NON-MOVABLE |

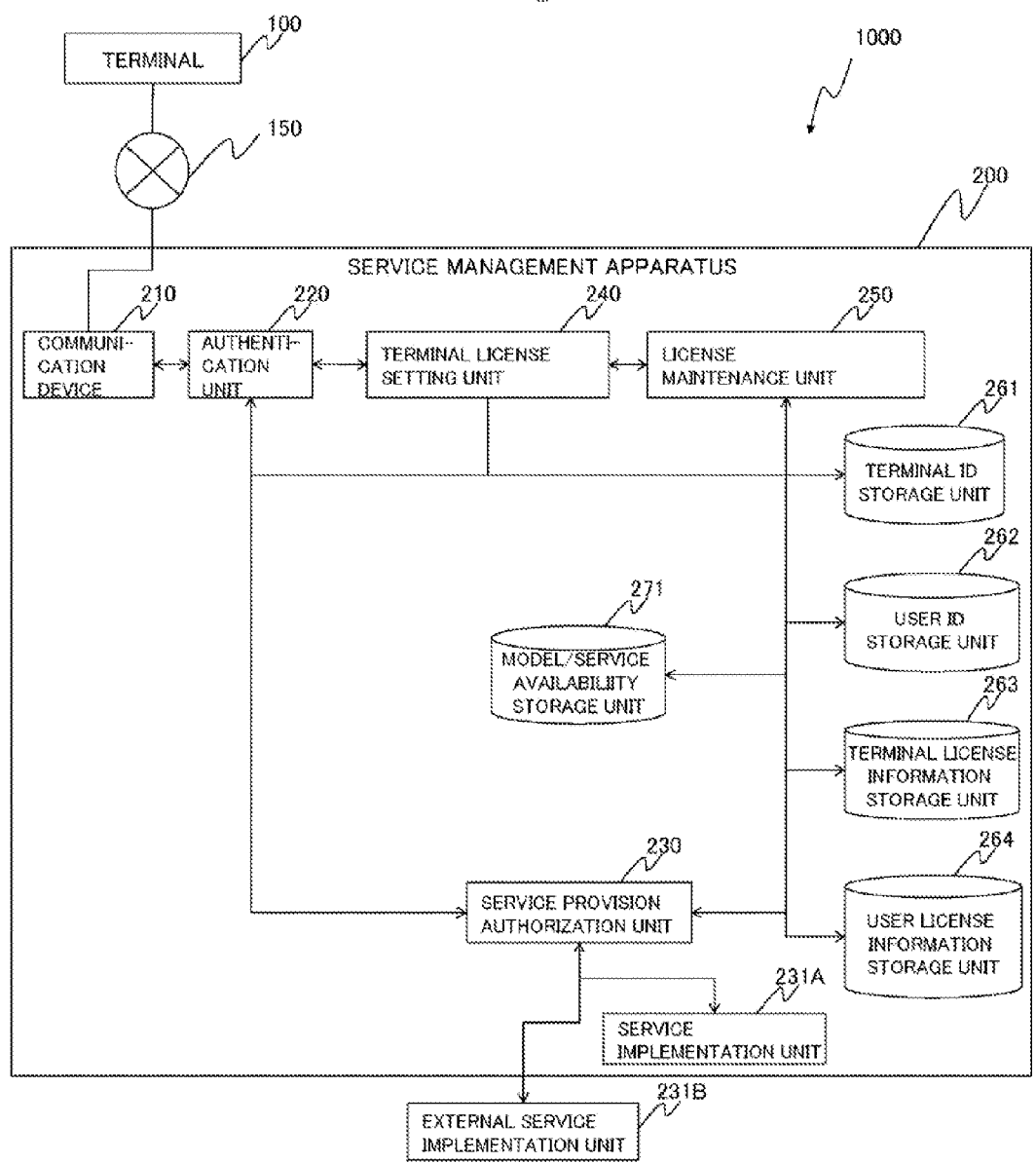

SERVICE MANAGEMENT APPARATUS, PROGRAM, AND SERVICE MANAGEMENT METHOD

BACKGROUND OF THE INVENTION

The present invention relates to a technology for an apparatus for managing a license of a service. The present invention claims priority from Japanese Patent Application No. 2012-283157 filed on Dec. 26, 2012, the disclosure of which is incorporated herein by reference.

There is conventionally known a technology for enabling a license to be shared so that the same user can enjoy a service without limit among a plurality of devices owned by the user. In Japanese Patent Laid-open Publication No. 2003-173381, there is disclosed a technology relating to such apparatus.

With an apparatus such as the one described above, there may occur a situation where any of the devices owned by the user can share the license without limit regardless of a property of the license.

SUMMARY OF THE INVENTION

The present invention has an object to provide a technology that enables finely managing a limitation on sharing of a license among devices depending on a property of the license even when the license is owned by the same user.

In order to solve the above-mentioned problem, according to one embodiment of the present invention, there is provided a service management apparatus including: a user storage unit which stores information for identifying a user and at least one terminal associated in advance with the user; a license information storage unit which stores a license including information for identifying a terminal to be permitted to use a predetermined service and license information for identifying a setting limitation on the license; a setting request reception unit which receives a setting request to set the license including information for identifying the terminal that has issued the setting request and the user of the terminal; an associated terminal identification processing unit which acquires information for identifying the terminal that is associated with the user included in the setting request; a license identification processing unit which identifies the license that each terminal that is identified by the information acquired by the associated terminal identification processing unit is permitted to use and is settable to the terminal that has issued the setting request; and a license setting processing unit which sets the license identified by the license identification processing unit to the terminal that has issued the setting request.

Further, according to one embodiment of the present invention, there is provided a program for causing a computer to execute a procedure for managing a permission to use a service, the program causing the computer to function as: a user storage unit which stores information for identifying a user and at least one terminal associated in advance with the user; a license information storage unit which stores a license including information for identifying a terminal to be permitted to use a predetermined service and license information for identifying a setting limitation on the license; and a control unit, the program causing the control unit to execute: a setting request reception step of receiving a setting request to set the license including information for identifying the terminal that has issued the setting request and the user of the terminal; an associated terminal identification processing step of acquiring information for identifying the terminal that is associated with the user included in the setting request; a license identification processing step of identifying the license that each terminal that is identified by the information acquired by the associated terminal identification processing unit is permitted to use and is settable to the terminal that has issued the setting request; and a license setting processing step of setting the license identified in the license identification processing step to the terminal that has issued the setting request.

Further, according to one embodiment of the present invention, there is provided a service management method for use in a service management apparatus which manages a permission to use a service, the service management apparatus including: a user storage unit which stores information for identifying a user and at least one terminal associated in advance with the user; and a license information storage unit which stores a license including information for identifying a terminal to be permitted to use a predetermined service and license information for identifying a setting limitation on the license, the service management method including: a setting request reception step of receiving a setting request to set the license including information for identifying the terminal that has issued the setting request and the user of the terminal; an associated terminal identification processing step of acquiring information for identifying the terminal that is associated with the user included in the setting request; a license identification processing step of identifying the license that each terminal that is identified by the information acquired by the associated terminal identification processing unit is permitted to use and is settable to the terminal that has issued the setting request; and a license setting processing step of setting the license identified in the license identification processing step to the terminal that has issued the setting request.

According to the present invention, it is possible to provide the technology that enables finely managing the limitation on sharing of the license among the devices depending on the property of the license even when the license is owned by the same user.

BRIEF DESCRIPTION OF THE DRAWINGS

In the accompanying drawings:

FIG. 3 is a table showing a data structure of a user ID storage unit;

FIG. 4 is a table showing a data structure of a terminal license information storage unit;

FIG. 9 is a diagram illustrating a flow of a latter half of the license setting processing;

FIG. 10 is a diagram illustrating an example of change in data stored in a terminal license information storage unit in the license setting processing;

FIG. 11 is a diagram illustrating an overall configuration of a service management system according to a second embodiment of the present invention;

DESCRIPTION OF THE PREFERRED EMBODIMENTS

Now, a description is given of a service management system 1000 to which service management according to a first embodiment of the present invention is applied with reference to the accompanying drawings.

Figure 1:
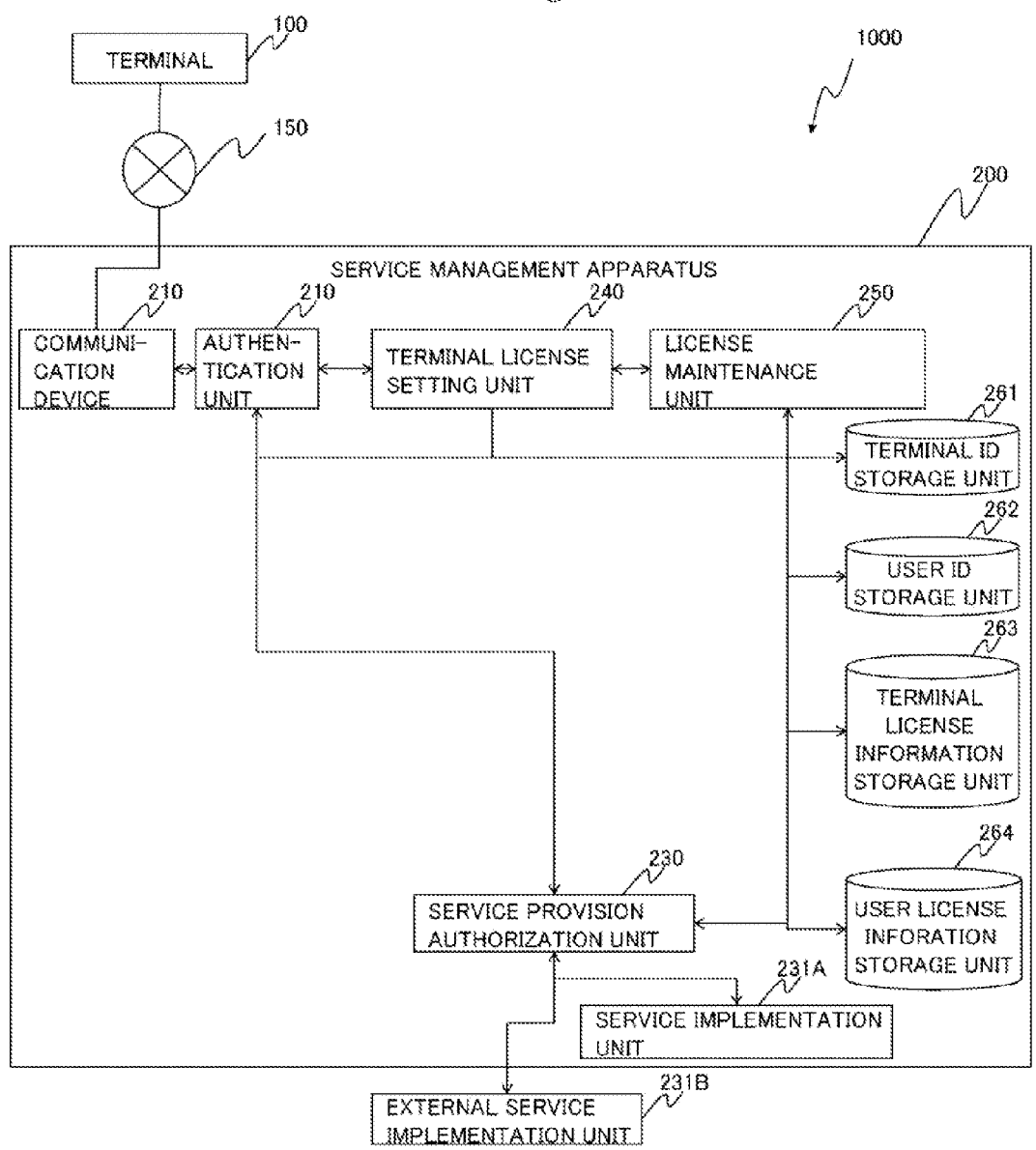
FIG. 1 is an overall configuration diagram of a service management system according to a first embodiment of the present invention.

FIG. 1 illustrates an overall configuration diagram of the service management system 1000. The service management system 1000 includes a terminal 100 and a service management apparatus 200 which provides and manages services to be used by the terminal via a network 150. Note that, the network 150 is a wired or wireless network such as a mobile phone network, a public network, a local area network (LAN), or a wide area network (WAN). The service management system 1000 may further include an external service implementation unit 231B, which is provided to the service management apparatus 200 by an external device. In that case, the external service implementation unit 231B may be connected to the service management apparatus 200 via the network 150, or may be connected thereto via a network different from the network 150.

The service management apparatus 200 includes a communication device 210, an authentication unit 220, a service provision authorization unit 230, a service implementation unit 231A which provides a service when use of the service is authorized by the service provision authorization unit 230, a terminal license setting unit 240, a license maintenance unit 250, a terminal ID storage unit 261, a user ID storage unit 262, a terminal license information storage unit 263, and a user license information storage unit 264.

The communication device 210 manages, via the network 150, establishment of a path of communication to/from the terminal 100 or the external service implementation unit 231B, execution of communication, termination of communication, and the like. Note that, when the communication is to be performed to/from the external service implementation unit 231B via the network different from the network 150, establishment of the communication path or the like may be performed via a communication device other than the communication device 210.

The authentication unit 220 determines whether or not the use of a service by the terminal 100 is an authorized one to verify whether or not the service is used by an authorized terminal 100 and an authorized user. In other words, the authentication unit 220 executes terminal authentication and user authentication, and denies an unauthorized access from an unauthorized user.

The service provision authorization unit 230 determines whether or not the use of the service by the terminal 100 is based on an authorized license, and requests the service implementation unit 231A or the external service implementation unit 231B to implement the service that is based on the authorized license. Note that, in this embodiment, the service provision authorization unit 230 determines whether or not the use of the service is based on the authorized license depending on whether or not the terminal 100 using the service is permitted to use the service.

The service implementation unit 231A implements various kinds of application services and responds to the terminal 100 using the service with a result, an intermediate result, or other such responses. For example, in a case of a service for providing the latest traffic congestion information, the service implementation unit 231A transmits appropriate traffic congestion information in a predetermined data format to the terminal 100 in response to a download request issued by the terminal 100. The external service implementation unit 231B operates substantially in the same manner, but the external service implementation unit 231B may respond not only to the terminal 100 using the service but also to the service management apparatus 200 with the result, the intermediate result, or other such responses.

The terminal license setting unit 240 sets the license to the terminal 100 that has issued a setting request by copying or moving license information for using the service that is assigned to the user's terminal 100 in response to the setting request. Specifically, the terminal license setting unit 240 is configured to receive the request for setting the license including information for identifying the terminal that has issued the setting request and the user of the terminal to set the license. Further, the terminal license setting unit 240 acquires the information for identifying the terminal associated with the user, which is included in the setting request, identifies the license that the identified terminal is permitted to use and that can be set to the terminal that has issued the setting request, and sets the identified license to the terminal that has issued the setting request.

Note that, as used herein, "copying a license" means copying the license information including a permission to use the service from the terminal 100 to another terminal 100 so that the another terminal 100 can use the license information, and "moving a license" means deleting the license information for using the service from the terminal 100 while copying the license information from the terminal 100 to another terminal 100 so that the another terminal 100 can use the license information, in other words, transferring the information.

The license maintenance unit 250 operates data stored in the terminal license information storage unit 263 in the processing of setting the license assigned to the terminal 100. Further, the license maintenance unit 250 receives, from an external management terminal (not shown) via the network 150, an instruction to change the data so as to reflect changing of the data such as generation/expiration/changing of the period/changing of the owner of the license, and operates the data stored in the terminal license information storage unit 263 based on the change instruction.

Figure 2:
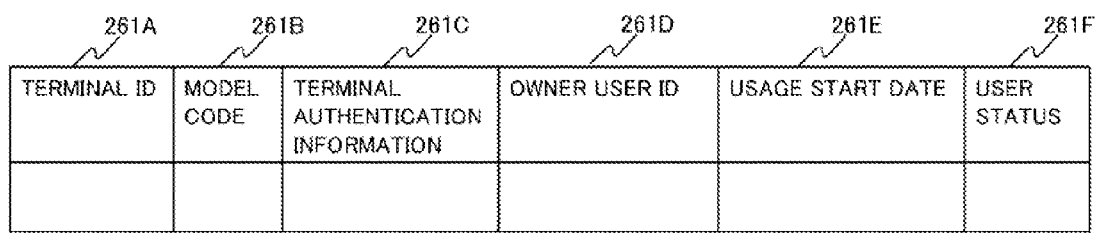
FIG. 2 is a table showing a data structure of a terminal ID storage unit.

FIG. 2 is a table showing a data structure of the terminal ID storage unit 261. As shown in FIG. 2, the terminal ID storage unit 261 stores a terminal ID 261A, which is information for identifying the terminal 100, a model code 261B, terminal authentication information 261C, an owner user ID 261D, a usage start date 261E, and a usage status 261F in association with one another.

The model code 261B is a code for identifying a model of the terminal 100 identified by the terminal ID 261A. As used herein, the "model code" means information for identifying a group of the terminals 100 that are provided by the same manufacturer or manufacturers that can be regarded as the same, and have similarities in terms of function and configuration above a certain degree, or the terminals 100 that have the same characteristics in terms of function and configuration. The terminal authentication information 261C is information specific to the terminal 100 identified by the terminal ID 261A, and the authenticity of the terminal can be confirmed with the use of a combination of the terminal authentication information 261C and the terminal ID. The owner user ID 261D is information for identifying an owner of the terminal 100 identified by the terminal ID 261A. The usage start date 261E is information for identifying a date on which the terminal 100 identified by the terminal ID 261A was provided the user so that the user could use the terminal 100. The usage status 261F is information for identifying a usage status of the terminal 100 identified by the terminal ID 261A, and classifications such as "in use", "being transferred", "stolen", "discarded", and "under repair" are set in advance as the statuses. The status of the terminal 100 is changed when an instruction to change the status or the like is received from the owner. Of the statuses, the statuses other than "in use" are each defined as an abnormal status in which the license cannot be moved or the movement of the license should be limited.

FIG. 3 is a table showing a data structure of the user ID storage unit 262. As shown in FIG. 3, the user ID storage unit 262 stores a user ID 262A, which is information for identifying the user of the terminal 100, user authentication information 262B, a name 262C, a first owned terminal ID 262D, a second owned terminal ID 262E, . . . , and an N-th owned terminal ID 262F (N is a natural number) in association with one another. In other words, the user ID storage unit 262 stores information for identifying the user and one or a plurality of terminals that are associated in advance with the user.

The user authentication information 262B is information for specifically identifying the user identified by the user ID 262A. The user authentication information 262B is information specific to the user identified by the user ID 262A, and the authenticity of the user can be confirmed with the use of a combination of the user authentication information 262B and the user ID. The name 262C is information for identifying the name of the user identified by the user ID 262A. The first owned terminal ID 262D is information for identifying one of the terminals that is owned by the user identified by the user ID 262A. The second owned terminal ID 262E is information for identifying, among the terminals that are owned by the user identified by the user ID 262A, one of the terminals other than the terminal identified by the first owned terminal ID 262D. The N-th owned terminal ID 262F is information for identifying, among the terminals that are owned by the user identified by the user ID 262A, one of the terminals other than the terminals identified by the first to (N−1)-th owned terminal IDs. Note that, when the user owns only one terminal 100, no specific terminal ID is stored as the second owned terminal ID 262E to the N-th owned terminal ID 262F.

FIG. 4 is a table showing a data structure of the terminal license information storage unit 263. As shown in FIG. 4, the terminal license information storage unit 263 stores an association, with the terminal 100, of the license that can use the service provided by the service implementation unit 231A or the external service implementation unit 231B and is managed in association with the terminal 100. The terminal license information storage unit 263 stores a license ID 263A, which is information for identifying the license associated with a specific terminal 100, a licensee terminal ID 263B, a service ID 263C, a start date 263D, an expiration date 263E, a maximum setting count 263F, a copying propriety 263G, and a movement propriety 263H in association with one another. In other words, the terminal license information storage unit 263 stores the license including information for identifying the terminal at which the use of a predetermined service is permitted and the license information for identifying setting limitations on the license.

The licensee terminal ID 263B is information for identifying the terminal 100 that is associated with the license identified by the license ID 263A. The service ID 263C is information for identifying the service that can be used by the license identified by the license ID 263A. The start date 263D is information for identifying a date on which the license identified by the license ID 263A became an authorized one. The expiration date 263E is information for identifying a date on which the license identified by the license ID 263A becomes an unauthorized one. The maximum setting count 263F is information for identifying a remaining number of times for which the license identified by the license ID 263A can be moved or copied. The copying propriety 263G is information for identifying whether or not the license identified by the license ID 263A can be copied to another terminal 100. The movement propriety 263H is information for identifying whether or not the license identified by the license ID 263A can be moved to another terminal 100.

Figure 5:
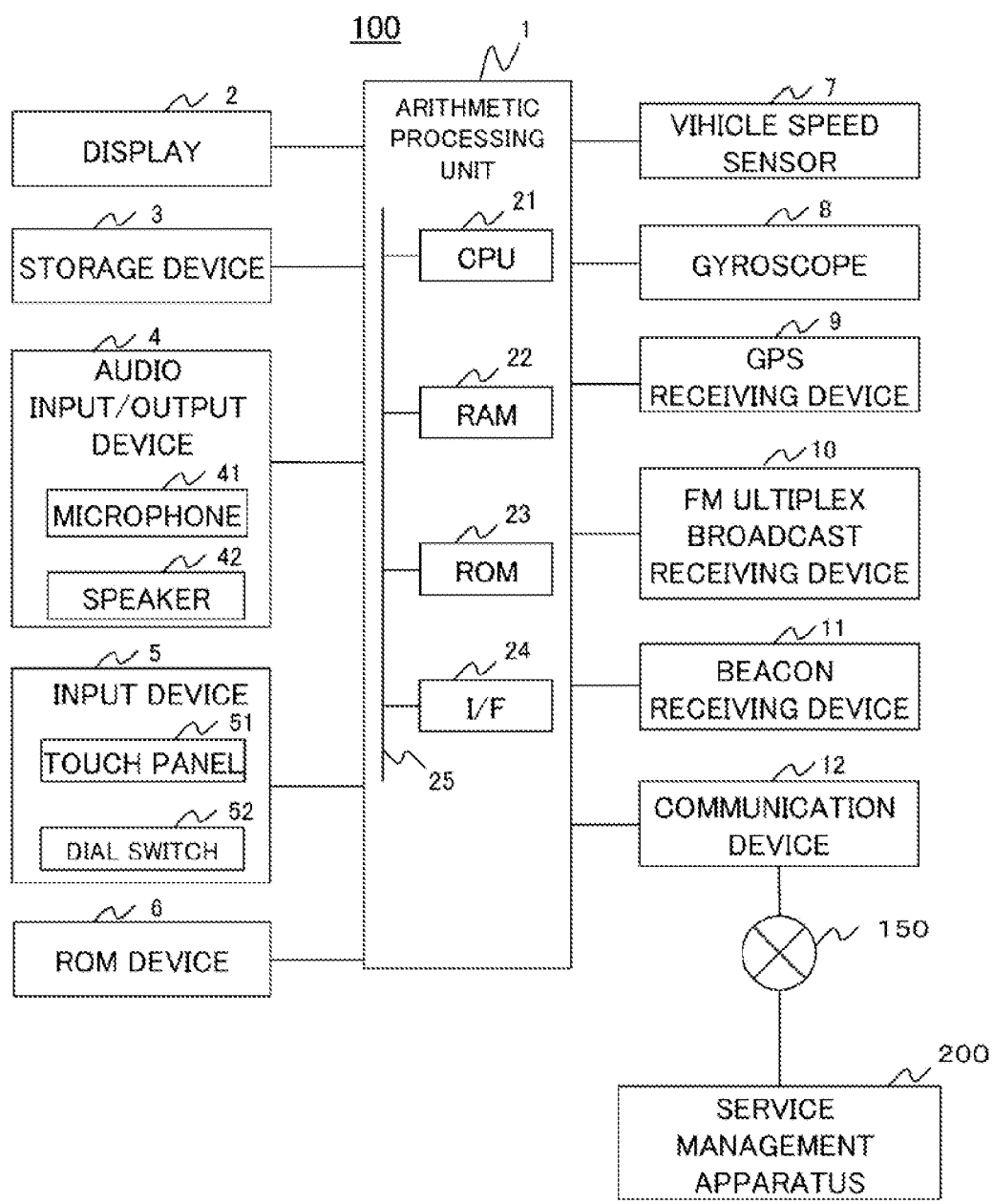
FIG. 5 is a diagram illustrating a schematic configuration of a terminal.

FIG. 5 is information for identifying a navigation device as an example of the terminal 100. Note that, in this embodiment, the navigation device is taken as an example of the terminal 100 for convenience of the description, but the present invention is not limited thereto. The terminal 100 may be a multi-function device capable of performing communication such as a so-called smartphone, or may be a device capable of performing communication such as a so-called tablet terminal, a personal computer, a workstation, a server device, a personal digital assistant (PDA), or a portable game machine.

FIG. 5 illustrates an overall configuration diagram of the terminal 100. The terminal 100 is the so-called navigation device capable of displaying map information to display a point indicating a current location of the terminal 100 and information for guiding the user to a route to a set destination.

The terminal 100 includes an arithmetic processing unit 1, a display 2, a storage device 3, an audio input/output device 4 (including a microphone 41 as an audio input device and a speaker 42 as an audio output device), an input device 5, a ROM device 6, a vehicle speed sensor 7, a gyroscope 8, a Global Positioning System (GPS) receiving device 9, an FM multiplex broadcast receiving device 10, a beacon receiving device 11, and a communication device 12.

The arithmetic processing unit 1 is a central unit which performs various kinds of processing. For example, the arithmetic processing unit 1 calculates the current location based on information output from various sensors including the vehicle speed sensor 7 and the gyroscope 8, the GPS receiving device 9, the FM multiplex broadcast receiving device 10, and the like. Further, based on acquired information on the current location, the arithmetic processing unit 1 reads out map data necessary for display from the storage device 3 or the ROM device 6.

Further, the arithmetic processing unit 1 expands the map data thus read out to graphics, and superimposes a mark indicating the current location on the graphics to display the resultant on the display 2. The arithmetic processing unit 1 uses the map data stored in the storage device 3 or the ROM device 6 and the like to search for a recommended route, which is an optimal route connecting a departure location specified by the user or the current location to the destination (which may include a via point or a stop-off point). The arithmetic processing unit 1 uses the speaker 42 or the display 2 to guide the user.

The arithmetic processing unit 1 of the terminal 100 has a configuration in which the respective devices are connected through a bus 25. The arithmetic processing unit 1 includes a CPU 21 which executes various kinds of processing such as numerical processing and controlling of various devices, a RAM 22 which stores the map data read out from the storage device 3, calculation data, and the like, a ROM 23 which stores programs and data, and an interface (I/F) 24 for connecting various pieces of hardware to the arithmetic processing unit 1.

The display 2 is a unit which displays graphics information generated by the arithmetic processing unit 1 and such other units. The display 2 includes a liquid crystal display, an organic EL display, or the like.

The storage device 3 includes a storage medium that is at least readable and writable such as a hard disk drive (HDD) or a non-volatile memory card.

On the storage medium, the map data (including link data on links constituting roads on a map) necessary for a general route search device and a terminal authentication information storage unit 400 are stored.

Figure 7:
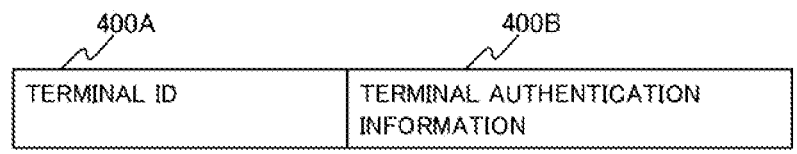
FIG. 7 is a table showing a data structure of a terminal authentication information storage unit.

FIG. 7 is a table showing a data structure of the terminal authentication information storage unit 400. As shown in FIG. 7, the terminal authentication information storage unit 400 stores a terminal ID 400A, which is information for identifying the terminal 100, and terminal authentication information 400B in association with each other. The terminal authentication information 400B is information specific to the terminal 100 identified by the terminal ID 400A, and the authenticity of the terminal can be confirmed with the use of the combination of the terminal authentication information 400B and the terminal ID.

A description is given referring back to FIG. 5. The audio input/output device 4 includes the microphone 41 as the audio input device and the speaker 42 as the audio output device. The microphone 41 acquires sounds output from outside of the terminal 100 such as a voice uttered by the user or other speakers.

The speaker 42 outputs a message to the user generated by the arithmetic processing unit 1 as sounds. The microphone 41 and the speaker 42 may be separately mounted to predetermined parts of surroundings used by the user, for example, a moving object to ride. The microphone 41 and the speaker 42 may be accommodated into one casing in an integrated manner. The terminal 100 may include a plurality of microphones and a plurality of speakers as the microphones 41 and the speakers 42, respectively.

The input device 5 is a device which receives an instruction given by the user through the user's operation. The input device 5 includes a touch panel 51 and a dial switch 52, and a scroll key, a map scale key, a keyboard, and a software keyboard as other hard switches (not shown). The input device 5 further includes a remote controller capable of giving an operation instruction in a remote manner to the terminal 100. The remote controller includes a dial switch, a scroll key, a map scale key, and the like, and can send information received by the respective keys and switches to the terminal 100.

The touch panel 51 is mounted on a display side of the display 2, and a display screen can be seen through the touch panel 51. The touch panel 51 identifies a touched position corresponding to X and Y coordinates on an image displayed on the display 2, and converts the touched position into coordinates to be output. The touch panel 51 includes a pressure-sensitive or capacitive input detection device and the like. Note that, the touch panel 51 may realize multi-touch capable of detecting a plurality of touched positions at the same time.

The dial switch 52 is rotatable in clockwise and counterclockwise directions, and generates a pulse signal at every rotation of a predetermined angle and outputs the pulse signal to the arithmetic processing unit 1. The arithmetic processing unit 1 acquires a rotation angle based on the number of pulse signals.

The ROM device 6 includes a storage medium that is at least readable such as a CD-ROM, a DVD-ROM, or other type of ROM and an integrated circuit (IC) card. On the storage medium, for example, video data and audio data are stored.

The vehicle speed sensor 7, the gyroscope 8, and the GPS receiving device 9 are used by the terminal 100 to detect the current location (for example, a position of a vehicle itself). The vehicle speed sensor 7 is a sensor which outputs a value used for calculating a traveling speed. The gyroscope 8 includes a fibre optic gyroscope, a vibrating structure gyroscope, or the like, and detects an angular velocity generated by rotation of the terminal 100. The GPS receiving device 9 receives a signal transmitted from a GPS satellite and measures a distance between the terminal 100 and the GPS satellite and a change rate of the distance. The GPS receiving device 9 performs this measurement with respect to three or more satellites to measure the current location, the traveling speed, and a traveling direction of the moving object.

The FM multiplex broadcast receiving device 10 receives an FM multiplex broadcast signal transmitted from an FM broadcast station. The FM multiplex broadcast includes summarized current traffic information, traffic regulation information, service area/parking area (SA/PA) information, parking lot information, weather information, and other such information of vehicle information communication system (VICS: trademark) information, and textual information that is broadcast by a radio station as FM multiplex general information.

The beacon receiving device 11 receives summarized current traffic information, traffic regulation information, service area/parking area (SA/PA) information, parking lot information, weather information, an emergency alarm, and other such information as the VICS information. The beacon receiving device is, for example, a receiving device such as an optical beacon that performs communication with the use of light or a radio wave beacon that performs communication with the use of radio waves.

The communication device 12 connects the terminal 100 to the network 150, and performs communication to/from other devices including the service management apparatus 200 that are connected to the network 150.

Figure 6:
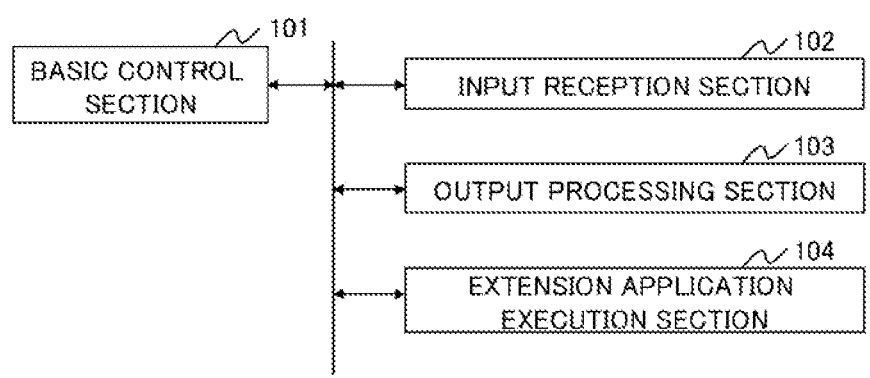
FIG. 6 is a functional block diagram of an arithmetic processing unit of the terminal.

FIG. 6 is a functional block diagram of the arithmetic processing unit 1. As illustrated in FIG. 6, the arithmetic processing unit 1 includes a basic control section 101, an input reception section 102, an output processing section 103, and an extension application execution section 104.

The basic control section 101 is a central functional section which performs various kinds of processing and controls other processing sections depending on specifics of processing. The basic control section 101 acquires information from various sensors, the GPS receiving device 9, and the like and performs map matching processing to identify the current location. The basic control section 101 associates a date and time of travel with the position of the vehicle and stores a travel history in the storage device 3 for each link constituting each road. The basic control section 101 outputs a current time in response to a request issued by each of the processing sections.

Further, the basic control section 101 searches for the optimal route (recommended route) connecting the current location and the destination. In the route search, the basic control section 101 uses a route search logic such as the Dijkstra's algorithm to search for a route achieving the lowest link cost based on link costs, which are set to predetermined road sections (links) in advance.

Further, in order to prevent the current location from deviating from the recommended route, the basic control section 101 guides the user by using the speaker 42 and the display 2 while displaying the recommended route.

The input reception section 102 receives an input instruction given by the user through the input device 5 or the microphone 41, and transmits to the basic control section 101, along with a coordinate position of a touch and audio information corresponding to information on the input instruction, an instruction to execute processing associated with details of the request. For example, when the user makes a request for a search for the recommended route, the input reception section 102 requests the basic control section 101 to execute processing associated with this request instruction.

The output processing section 103 receives information constituting a screen to be displayed such as polygon information, converts the information into a signal for performing drawing on the display 2, and gives an instruction to perform the drawing to the display 2.

The extension application execution section 104 executes an application serving as a supplementary or extended function for the processing executed by the basic control section 101 to realize the extension of the functions of the terminal 100. Specifically, the extension application execution section 104 performs processing on the terminal side for using the service provided by the service management apparatus 200, transmits a request for use of the service provided by the service management apparatus 200 as necessary via the communication device 12, receives a result or intermediate result of the service, and outputs the received result or intermediate result to the output processing section 103. Further, the extension application execution section 104 transmits the setting request for the license to the service management apparatus 200. In other words, the extension application execution section 104 can make a request to set the license for the service that is assigned to another terminal 100 owned by the owner to the terminal 100 depending on an attribute of the license.

The above-mentioned functional sections of the arithmetic processing unit 1, specifically, the basic control section 101, the input reception section 102, the output processing section 103, and the extension application execution section 104 are built by the CPU 21 reading and executing a predetermined program. For this purpose, the program for realizing the respective functional sections is stored on the RAM 22.

Note that, the above-mentioned components are obtained by dividing the configuration of the terminal 100 based on main processing specifics of the components in order to facilitate understanding. Accordingly, how the components are divided and their names do not limit the invention of this application. The configuration of the terminal 100 may be divided into a larger number of components depending on the processing specifics. Further, the configuration of the terminal 100 may be divided so that one component executes a larger number of pieces of processing.

In addition, the respective functional sections may be built by hardware (an ASIC, a GPU, or the like). Further, the respective functional sections may be executed by one piece of hardware, or may be executed by a plurality of pieces of hardware.

Description of Operation

Figure 8:
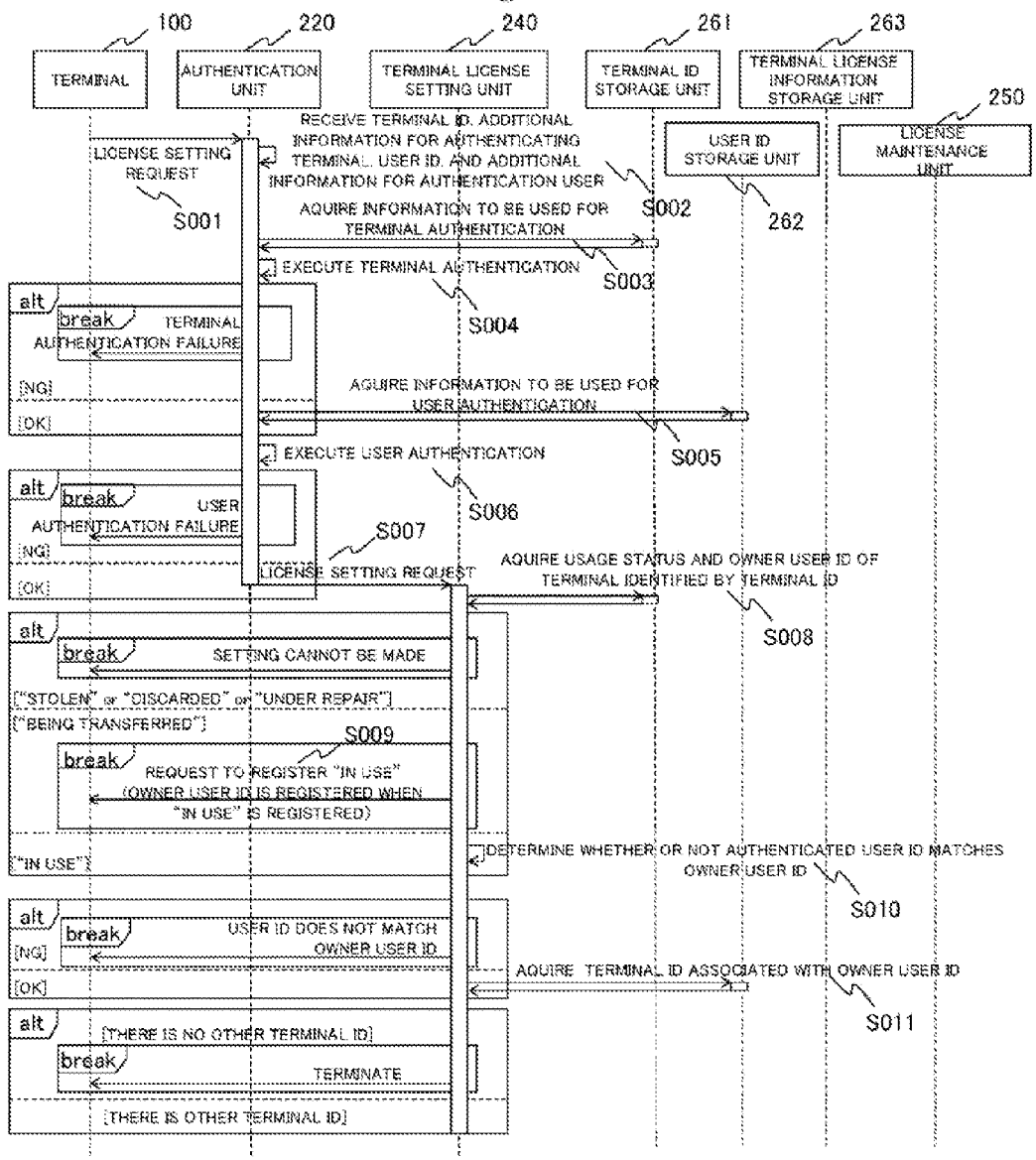
FIG. 8 is a diagram illustrating a flow of a first half of license setting processing.

Next, a description is given of an operation of license setting processing executed by the service management apparatus 200. FIG. 8 is a sequence diagram illustrating a first half of the license setting processing executed by the service management apparatus 200. This sequence is executed at appropriate timing after the service management apparatus 200 and the terminal 100 are activated.

First, the authentication unit 220 of the service management apparatus 200 receives a license setting request transmitted from the terminal 100 (Step S001).

The authentication unit 220 then receives the terminal ID as the information for identifying the terminal, additional information for authenticating the terminal, the user ID as the information for identifying the user, and additional information for authenticating the user (Step S002). Specifically, the authentication unit 220 transmits to the terminal 100 an entry screen and the like for transmitting to the authentication unit 220 information on the terminal ID, the terminal authentication information such as a password as the additional information for authenticating the terminal, the user ID, and the user authentication information such as a password as the additional information for identifying the user, and receives the information transmitted as a response.

The authentication unit 220 then acquires information to be used for authenticating the terminal (Step S003). Specifically, the authentication unit 220 uses the terminal ID received in Step S002 as a key to perform matching between the terminal ID in question and the terminal ID 261A of the terminal ID storage unit 261, and reads out and acquires the terminal authentication information 261C of a record having the matched terminal ID.

The authentication unit 220 next executes the authentication on the terminal (Step S004). Specifically, the authentication unit 220 executes the authentication on the terminal by determining whether or not the terminal authentication information read out in Step S003 from the terminal ID storage unit 261 matches the terminal authentication information received in Step S002. When the authentication on the terminal failed, the authentication unit 220 transmits information indicating the authentication failure to the terminal 100.

When the authentication on the terminal succeeds (when the authentication results in success in Step S004), the authentication unit 220 acquires information to be used for authenticating the user (Step S005). Specifically, the authentication unit 220 uses the user ID received in Step S002 as a key to perform matching between the user ID in question and the user ID 262A of the user ID storage unit 262, and reads out and acquires the user authentication information 262B of a record having the matched user ID.

The authentication unit 220 then executes the authentication on the user (Step S006). Specifically, the authentication unit 220 executes the authentication on the user by determining whether or not the user authentication information read out in Step S005 from the user ID storage unit 262 matches the user authentication information received in Step S002. When the authentication on the user failed, the authentication unit 220 transmits information indicating the authentication failure to the terminal 100.

When the authentication on the user succeeds (when the authentication results in success in Step S006), the authentication unit 220 transmits the license setting request to the terminal license setting unit 240 (Step S007). More specifically, the authentication unit 220 passes the terminal ID and the user ID to the terminal license setting unit 240 while transmitting the license setting request.

Next, the terminal license setting unit 240 acquires information on the usage status and the owner user ID of the terminal identified by the terminal ID (Step S008). Specifically, the terminal license setting unit 240 uses the terminal ID passed in Step S007 as a key to perform matching between the terminal ID in question and the terminal ID 261A of the terminal ID storage unit 261, and reads out and acquires the usage status 261F and the owner user ID 261D of a record having the matched terminal ID.

When the usage status is any one of "stolen", "discarded", and "under repair" or "being transferred", the license cannot be set to the terminal in question, and hence the terminal license setting unit 240 then transmits this fact to the terminal 100. Note that, when the usage status is "being transferred", the terminal license setting unit 240 transmits to the terminal 100 a request to register "in use", and the owner user ID is registered when "in use" is registered (Step S009).

When the usage status is "in use", the terminal license setting unit 240 determines whether or not the authenticated user ID matches the owner user ID (Step S010). Specifically, the terminal license setting unit 240 compares the user ID passed in Step S007 with the information on the owner user ID 261D acquired in Step S008. When the user ID does not match the owner user ID 261D, the terminal license setting unit 240 transmits information for displaying this fact to the terminal 100.

When the user ID matches the owner user ID, the terminal license setting unit 240 acquires the terminal ID of another terminal having the user ID in question included as the owner user ID 261D (Step S011). When the terminal ID of another terminal is not acquired, in other words, the user in question only owns the terminal in use as the owner, the terminal license setting unit 240 transmits to the terminal 100 information for displaying the fact that the setting processing is finished because there is no other terminal.

FIG. 9 is a sequence diagram illustrating a latter half of the license setting processing executed by the service management apparatus 200. This sequence is executed subsequently to the completion of Step S011 of the license setting processing, after the service management apparatus 200 and the terminal 100 are activated.

The terminal license setting unit 240 acquires information on the license owned by the terminal ID of the terminal to which the license is to be copied (hereinafter referred to as "copying destination") (Step S012). Specifically, the terminal license setting unit 240 acquires all the service IDs 263C stored in, of the records of the terminal license information storage unit 263, records each of which stores the same terminal ID as the terminal ID of the copying destination as its licensee terminal ID 263B and in which the current date/time is included in a period from its start date 263D to its expiration date 263E. In other words, the terminal license setting unit 240 acquires the service IDs of the services that the terminals used by the user are already permitted to use.

The terminal license setting unit 240 identifies the license that can be copied to the terminal ID as the copying destination (Step S013). Specifically, the terminal license setting unit 240 uses the user ID passed in Step S007 as a key to perform matching between the user ID in question and the user ID 262A of the user ID storage unit 262, and reads out the first owned terminal ID 262D, the second owned terminal ID 262E . . . , and the N-th owned terminal ID 262F of a record having the matched user ID. The terminal license setting unit 240 then acquires the terminal IDs that have been read out and are other than the terminal ID passed in Step S007, that is, other than the terminal ID as the copying destination. The terminal license setting unit 240 performs matching between each of the acquired terminal IDs and the licensee terminal ID 263B of the terminal license information storage unit 263, and lists the service ID 263C of a hit record.

Moreover, the terminal license setting unit 240 excludes the same service ID as the service ID 263C in use acquired in Step S012 from the list, and also excludes from the list the service ID of the service having "non-copyable" as the copying propriety 263G and the service ID of the service whose expiration date 263E has passed even when its copying propriety 263G is "copyable". Note that, even when the same service ID as the service ID of the service identified in Step S012 is included in the list, the terminal license setting unit 240 may avoid excluding such service ID from the list if the corresponding license has the expiration date 263E that arrives later, or may avoid excluding such service ID from the list if the corresponding license has the larger maximum setting count 263F.

Next, the terminal license setting unit 240 acquires information on the license owned by the terminal ID of the terminal to which the license is to be moved (hereinafter referred to as "movement destination") (Step S014). Specifically, the terminal license setting unit 240 acquires all the service IDs 263C stored in, of the records of the terminal license information storage unit 263, records each of which stores the same terminal ID as the terminal ID of the movement destination as its licensee terminal ID 263B and in which the current date/time is included in a period from its start date 263D to its expiration date 263E. In other words, the terminal license setting unit 240 acquires the service IDs of the services that the terminals used by the user are already permitted to use.

The terminal license setting unit 240 identifies the license that can be moved to the terminal ID as the movement destination (Step S015). Specifically, the terminal license setting unit 240 uses the user ID passed in Step S007 as a key to perform matching between the user ID in question and the user ID 262A of the user ID storage unit 262, and reads out the first owned terminal ID 262D, the second owned terminal ID 262E . . . , and the N-th owned terminal ID 262F of a record having the matched user ID. The terminal license setting unit 240 then acquires the terminal IDs that have been read out and are other than the terminal ID passed in Step S007, that is, other than the terminal ID as the movement destination. The terminal license setting unit 240 performs matching between each of the acquired terminal IDs and the licensee terminal ID 263B of the terminal license information storage unit 263, and lists the service ID 263C of a hit record.

Moreover, the terminal license setting unit 240 excludes the same service ID as the service ID 263C in use acquired in Step S014 from the list, and also excludes from the list the service ID of the service having "copyable" as the copying propriety 263G, the service ID of the service having "non-movable" as the movement propriety 263H, and the service ID of the service whose expiration date 263E has passed even when its copying propriety 263G is "non-copyable" and its movement propriety 263H is "movable". Note that, even when the same service ID as the service ID of the service identified in Step S014 is included in the list, the terminal license setting unit 240 may avoid excluding such service ID from the list if the corresponding license has the expiration date 263E that arrives later, or may avoid excluding such service ID from the list if the corresponding license has the larger maximum setting count 263F.

Next, when the list identified in Step S013 includes at least one service ID, the terminal license setting unit 240 determines that there is a copyable license and requests the license maintenance unit 250 to copy the copyable license assigned to another terminal (Step S016). Specifically, the terminal license setting unit 240 requests the license maintenance unit 250 to copy, for the service included in the list identified in Step S013, the copyable license that is assigned to another terminal owned by the same user to the terminal as the copying destination.

The license maintenance unit 250 accesses to the terminal license information storage unit 263 to execute processing of copying the license (Step S017). Specifically, the license maintenance unit 250 generates a new record by copying the record of the corresponding license on the terminal license information storage unit 263, stores an ID that is different from any of the IDs of the other records as the license ID 263A of the generated record, and stores the terminal ID received in Step S007 as the licensee terminal ID 263B.

Next, when the list identified in Step S015 includes at least one service ID, the terminal license setting unit 240 determines that there is a license that cannot be copied but can be moved (movable license), and requests the license maintenance unit 250 to move the movable license assigned to another terminal (Step S018). Specifically, the terminal license setting unit 240 requests the license maintenance unit 250 to move, for the service included in the list identified in Step S015, the license that cannot be copied but can be moved and that is assigned to another terminal owned by the same user to the terminal as the movement destination.

The license maintenance unit 250 accesses to the terminal license information storage unit 263 to execute processing of moving the license (Step S019). Specifically, the license maintenance unit 250 stores, on the terminal license information storage unit 263, the terminal ID received in Step S007 as the licensee terminal ID 263B of the record of the license to be moved.

Next, the terminal license setting unit 240 transmits to the terminal 100 information indicating that the setting of the license has been finished (for example, a screen showing a setting target and a result of the setting) (Step S20).

The operation of the license setting processing is described above. Through the license setting processing, it is possible to finely manage sharing of the license among the devices depending on the property of the license even when the license is owned by the same user.

FIG. 10 illustrates an example of change in data stored in the terminal license information storage unit 263 in the license setting processing according to the first embodiment of the present invention.

In the example of FIG. 10, information on a terminal having the terminal ID 261A of "001" and the owner user ID 261D of "A" is stored in advance in the terminal ID storage unit 261, and a change of data exhibited when the user "A" purchases a new terminal having the terminal ID of "004" and sets the license to the terminal is given as an example. After the user "A" purchases the terminal having the terminal ID of "004", the ID "004" is added as the second owned terminal ID 262E to the record having "A" stored as the user ID 262A of the user ID storage unit 262. Accordingly, the terminal having the terminal ID of "001" is registered to the terminal having the terminal ID of "004" as the terminal owned by the same owner, and hence the license is to be copied or moved from the terminal having the terminal ID of "001" to the terminal having the terminal ID of "004". In this example, the licensee terminal having the terminal ID of "004" already has the authorized license for the service ID 263C "A01" (the license having the license ID 263A of "116"), and hence the corresponding license ID "111" is not to be copied. This is because both license IDs has the same service ID of "A01" and the expiration date 263E of the license ID "111" is to pass earlier than that of the license ID "116".

The license IDs "112" and "113" are targets of the setting because those IDs do not correspond to the licenses already assigned to the terminal "004". In this case, the license ID "112" is to be moved because its copying propriety 263G is "non-copyable" and its movement propriety 263H is "movable", and the license ID "113" is to be copied because its copying propriety 263G is "copyable". Accordingly, the licensee terminal ID 263B of the license having the license ID of "112" is changed to that of the terminal ID "004" and this license is thus moved. Moreover, a new license ID "118" is assigned to the license having the license ID of "113" and the ID "004" is stored as the licensee terminal ID 263B, and this license is thus copied.

The first embodiment of the present invention is described above. According to the first embodiment, it is possible to finely manage a limitation on the sharing of the license among the devices depending on the property of the license even when the license is owned by the same user. Note that, the present invention is not limited to the embodiment described above. Various modifications can be made to the first embodiment described above within the scope of the technical idea of the present invention.

Now, a description is given of a second embodiment of the present invention. The second embodiment basically has a configuration similar to that of the first embodiment, and hence a description of a common configuration is omitted and what is different from the first embodiment is mainly described below.

FIG. 11 is a diagram illustrating an overall configuration of a service management system 1000 according to the second embodiment. In the second embodiment, the service management apparatus 200 further includes a model/service availability storage unit 271.

Figure 12:
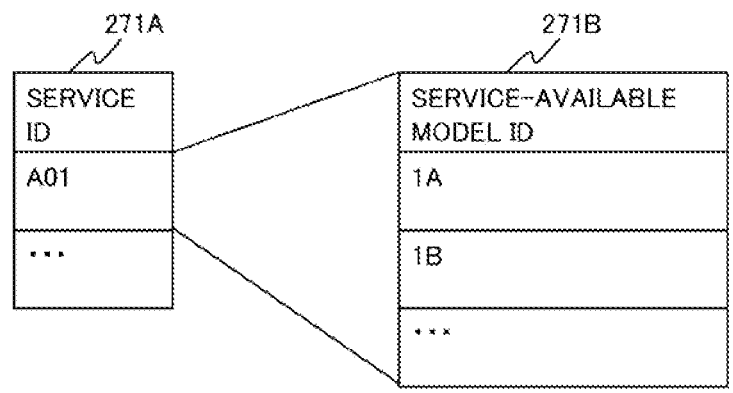
FIG. 12 is a table showing a data structure of a model/service availability storage unit according to the second embodiment of the present invention.

FIG. 12 is a table showing a data structure of the model/service availability storage unit 271. As shown in FIG. 12, the model/service availability storage unit 271 stores an association between the service provided by the service implementation unit 231A or the external service implementation unit 231B and the model of the terminal 100 at which the corresponding service is available (service-available model ID 271B).

Figure 13:
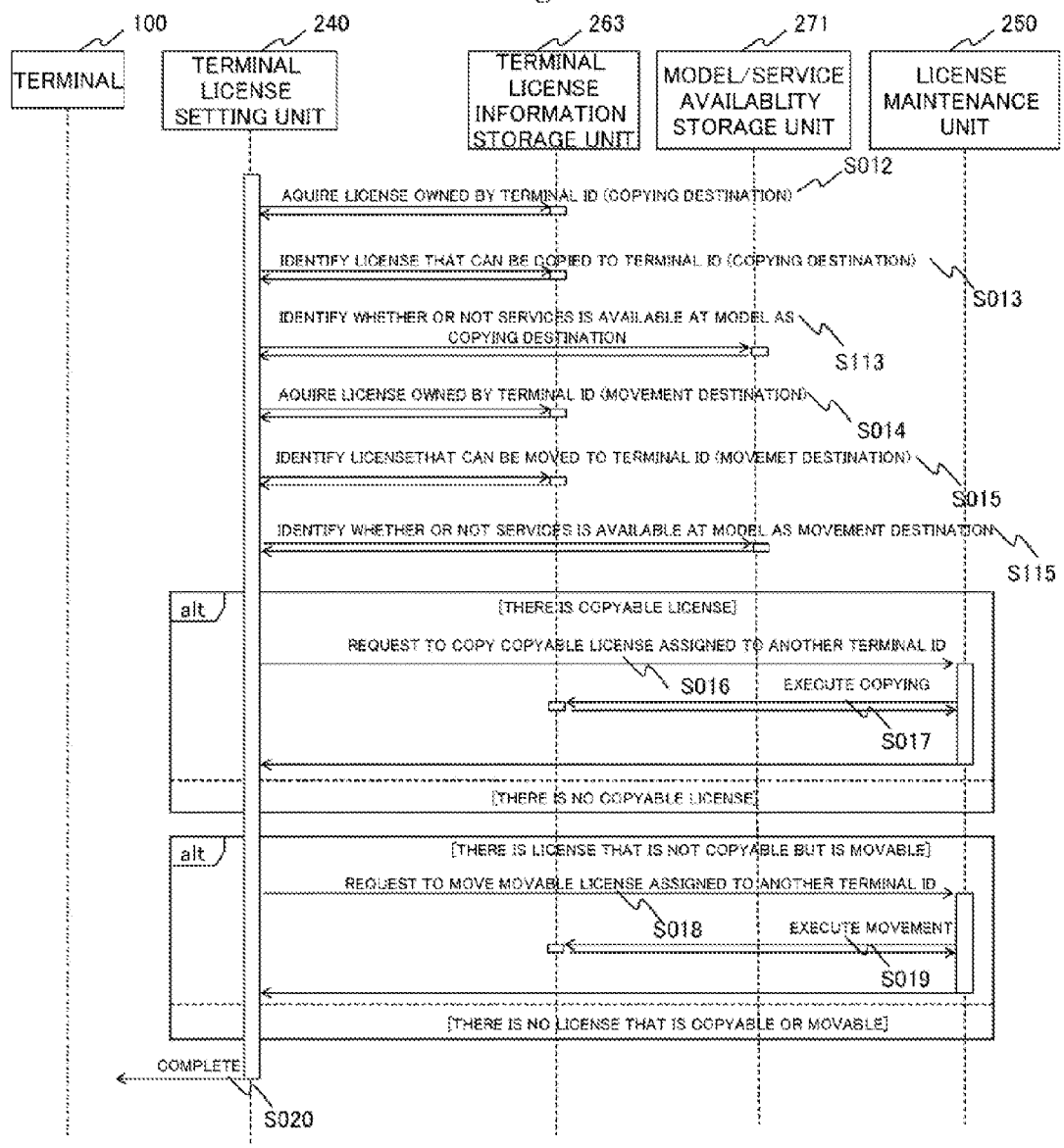
FIG. 13 is a diagram illustrating a flow of a latter half of license setting processing according to the second embodiment of the present invention.

FIG. 13 is a sequence diagram illustrating a latter half of license setting processing according to the second embodiment of the present invention. This sequence is executed subsequently to the completion of Step S011 of the first half of the license setting processing illustrated in FIG. 8, after the service management apparatus 200 and the terminal 100 are activated.

In the second embodiment, processing of identifying whether or not the service is available at the model as the copying destination is executed between the processing of Step S013 and the processing of Step S014 (Step S113). This processing of Step S113 is processing in which the terminal license setting unit 240 inquires of the model/service availability storage unit 271 whether or not the service of the license identified in Step S013 is available at the terminal as the copying destination and acquires a response to the inquiry. Specifically, when the service-available model ID 271B of the model/service availability storage unit 271 corresponding to the service in question includes the model code 261B of the terminal as the copying destination, the terminal license setting unit 240 acquires a response indicating that the service is available, and otherwise acquires a response indicating that the service is unavailable. The terminal license setting unit 240 then excludes, from the list of the services to be copied, the service for which the response indicating that the service is unavailable is acquired.

Similarly, in the second embodiment, processing of identifying whether or not the service is available at the model as the movement destination is executed between the processing of Step S015 and the processing of Step S016 (Step S115). This processing of Step S115 is processing in which the terminal license setting unit 240 inquires of the model/service availability storage unit 271 whether or not the service of the license identified in Step S015 is available at the terminal as the movement destination and acquires a response to the inquiry. Specifically, when the service-available model ID 271B of the model/service availability storage unit 271 corresponding to the service in question includes the model code 261B of the terminal as the movement destination, the terminal license setting unit 240 acquires a response indicating that the service is available, and otherwise acquires a response indicating that the service is unavailable. The terminal license setting unit 240 then excludes, from the list of the services to be moved, the service for which the response indicating that the service is unavailable is acquired.

The service management system 1000 of the second embodiment is described above. According to the second embodiment, it is possible to avoid setting the license to the terminal at which the service is unavailable and thus impairing an appropriate usage environment.

Now, a description is given of a third embodiment of the present invention. The third embodiment basically has a configuration similar to that of the first embodiment, and hence a description of a common configuration is omitted and what is different from the first embodiment is mainly described below.

Figure 14:
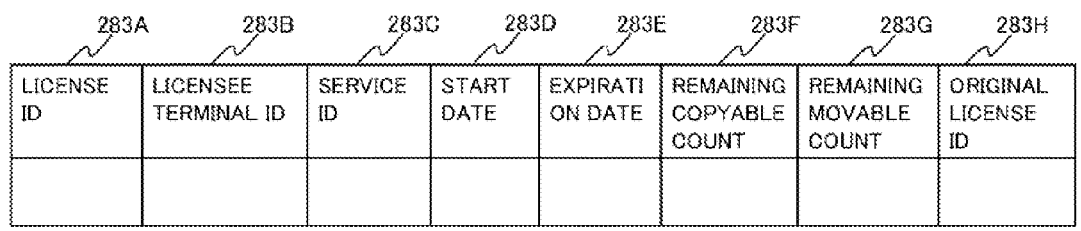
FIG. 14 is a table showing a data structure of a terminal license information storage unit according to a third embodiment of the present invention.

FIG. 14 is a table showing a data structure of a terminal license information storage unit 283 according to the third embodiment. As shown in FIG. 14, the terminal license information storage unit 283 is different from the terminal license information storage unit 263 according to the first embodiment in a part of the items. The terminal license information storage unit 283 includes, for each license identified by the license ID 283A, pieces of information for identifying a remaining copyable count 283F, a remaining movable count 283G, and an original license ID 283H. Stored as the remaining copyable count 283F is, for the license for which the number of times for which the license can be copied is limited, information for identifying a remaining number of times for which the license can be copied. Similarly, stored as the remaining movable count 283G is, for the license for which the number of times for which the license can be moved is limited, information for identifying a remaining number of times for which the license can be moved. Stored as the original license ID 283H is information for identifying an original license ID indicating a source of the copied license.

Figure 15:
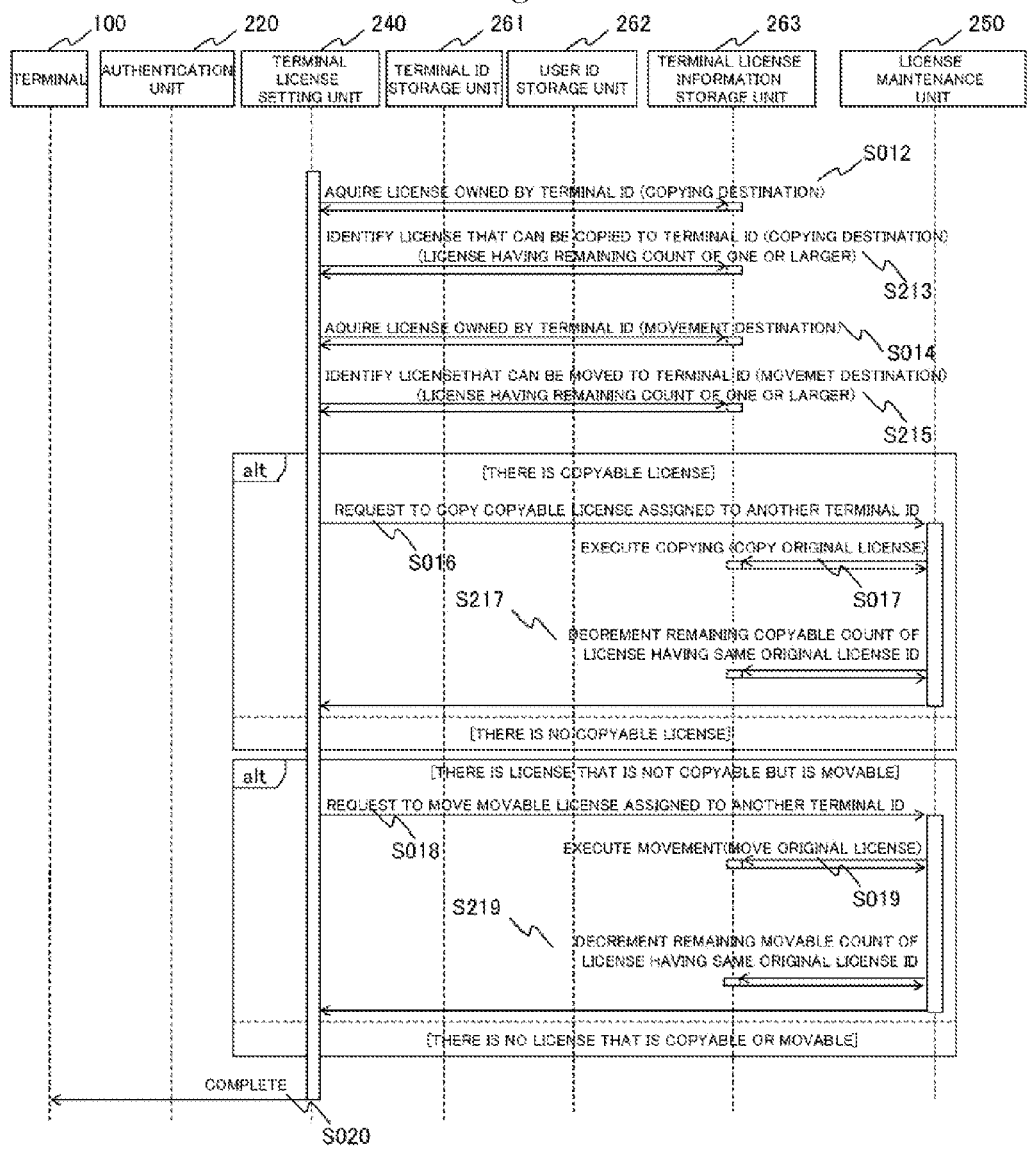
FIG. 15 is a diagram illustrating a flow of a latter half of license setting processing according to the third embodiment of the present invention.

FIG. 15 is a sequence diagram illustrating a latter half of license setting processing according to the third embodiment of the present invention. This sequence is executed subsequently to the completion of Step S011 of the first half of the license setting processing illustrated in FIG. 8, after the service management apparatus 200 and the terminal 100 are activated.

The license setting processing of the third embodiment is different from the license setting processing of the first embodiment in that the processing of Step S213 is executed in place of the processing of Step S013, the processing of Step S215 is executed in place of the processing of Step S015, the processing of Step S217 is executed between Step S017 and Step S018, and the processing of Step S219 is executed between Step S019 and Step S020.

In Step S213, the terminal license setting unit 240 identifies the license that can be copied to the terminal ID as the copying destination (the license having the remaining count of one or larger) (Step S213). Specifically, the terminal license setting unit 240 uses the user ID passed in Step S007 as a key to perform matching between the user ID in question and the user ID 262A of the user ID storage unit 262, and reads out the first owned terminal ID 262D, the second owned terminal ID 262E, . . . , and the N-th owned terminal ID 262F of a record having the matched user ID. The terminal license setting unit 240 then acquires the terminal IDs that have been read out and are other than the terminal ID passed in Step S007, that is, other than the terminal ID as the copying destination. The terminal license setting unit 240 performs matching between each of the acquired terminal IDs and a licensee terminal ID 283B of the terminal license information storage unit 283, and lists a service ID 283C of a hit record.

Moreover, the terminal license setting unit 240 excludes the same service ID as the service ID in use acquired in Step S012 from the list, and also excludes the service ID of the service having the remaining copyable count 283F of smaller than one and the service ID of the service whose expiration date 283E has passed even when its remaining copyable count 283F is one or larger. Note that, even when the same service ID as the service ID of the service identified in Step S012 is included in the list, the terminal license setting unit 240 may avoid excluding such service ID from the list if the corresponding license has the expiration date 283E that arrives later.

In Step S215, the terminal license setting unit 240 identifies the license that can be moved to the terminal ID as the movement destination (the license having the remaining count of one or larger) (Step S215). Specifically, the terminal license setting unit 240 uses the user ID passed in Step S007 as a key to perform matching between the user ID in question and the user ID 262A of the user ID storage unit 262, and reads out the first owned terminal ID 262D, the second owned terminal ID 262E, . . . , and the N-th owned terminal ID 262F of a record having the matched user ID. The terminal license setting unit 240 then acquires the terminal IDs that have been read out and are other than the terminal ID passed in Step S007, that is, other than the terminal ID as the movement destination. The terminal license setting unit 240 performs matching between each of the acquired terminal IDs and the licensee terminal ID 283B of the terminal license information storage unit 283, and lists the service ID 283C of a hit record. Moreover, the terminal license setting unit 240 excludes the same service ID as the service ID in use acquired in Step S014 from the list, and also excludes from the list the service ID of the service having the remaining copyable count 283F of one or larger, the service ID of the service having the remaining movable count 283G of smaller than one, and the service ID of the service whose expiration date 283E has passed even when its remaining copyable count 283F is smaller than one and its remaining movable count 283G is one or larger. Note that, even when the same service ID as the service ID of the service identified in Step S014 is included in the list, the terminal license setting unit 240 may avoid excluding such service ID from the list if the corresponding license has the expiration date 283E that arrives later.

In Step S217, the license maintenance unit 250 decrements the remaining copyable count of the license having the same original license ID (Step S217). Specifically, the license maintenance unit 250 stores information for identifying the original license (the license as an origin itself in the case of copying the license) as the original license ID 283H of the license that has been copied in Step S017. In addition, the license maintenance unit 250 decrements the remaining copyable counts 283F of the license that was copied in the past, and of the license as a source of this copying and the license as a destination of this copying.

In Step S219, the license maintenance unit 250 decrements the remaining movable count of the license having the same original license ID (Step S219). Specifically, the license maintenance unit 250 decrements the remaining movable counts 283G of the licenses having the same original license ID 283H as that of the license that has been moved in Step S019 including the license that was copied in the past, and the license as the source of this copying and the license as the destination of this copying.

The service management system 1000 according to the third embodiment is described above. According to the third embodiment, for example, it is possible to appropriately limit the number of times for which the license, on which a limitation of the number of times needs to be imposed relating to its setting, can be copied or moved.

Now, a description is given of a fourth embodiment of the present invention. The fourth embodiment basically has a configuration similar to that of the first embodiment, and hence a description of a common configuration is omitted and what is different from the first embodiment is mainly described below.

Figure 16:
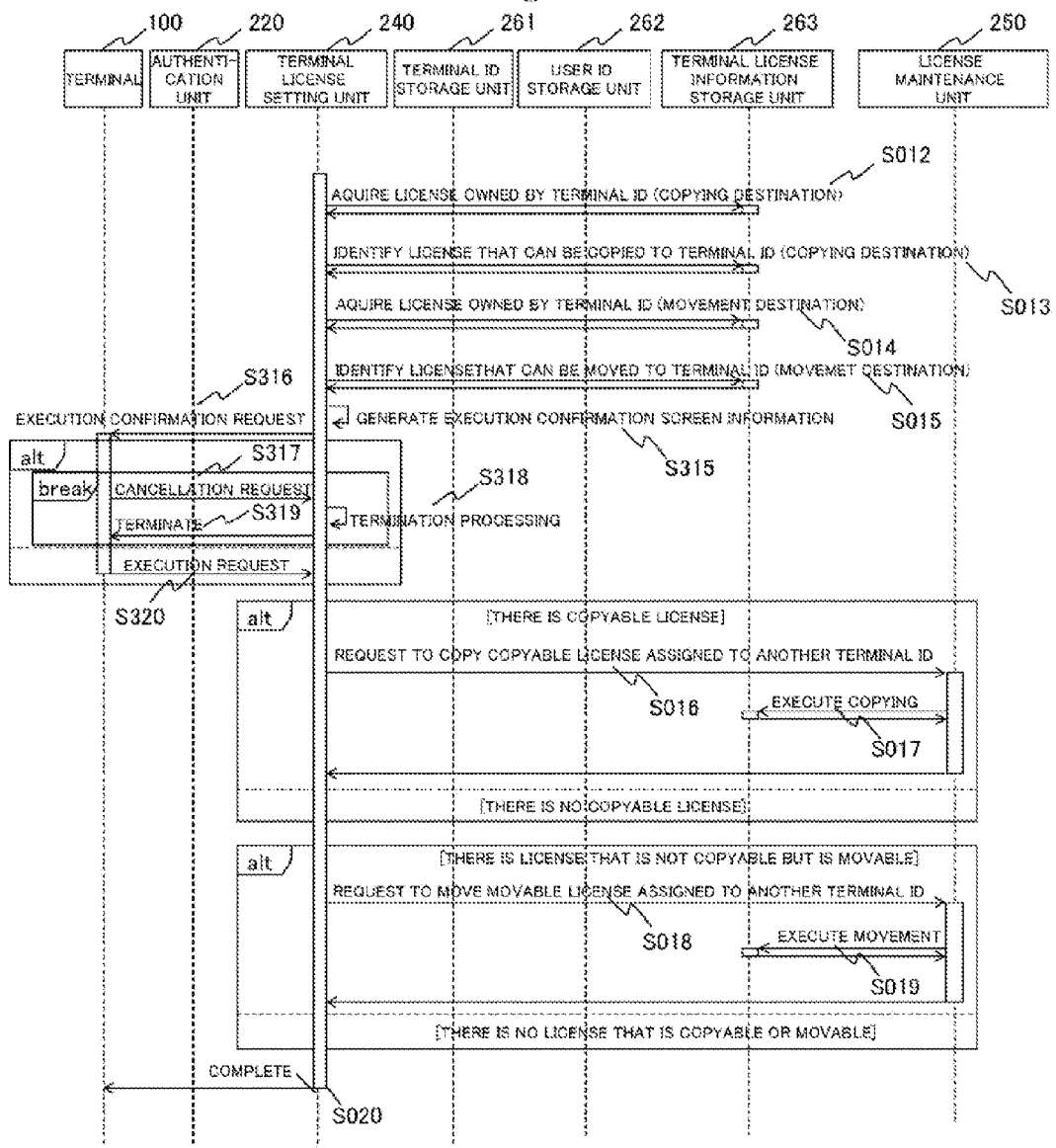
FIG. 16 is a diagram illustrating a flow of a latter half of license setting processing according to a fourth embodiment of the present invention.

FIG. 16 is a sequence diagram illustrating a latter half of license setting processing according to the fourth embodiment of the present invention. This sequence is executed subsequently to the completion of Step S011 of the first half of the license setting processing illustrated in FIG. 8, after the service management apparatus 200 and the terminal 100 are activated.

The license setting processing of the fourth embodiment is different from the license setting processing of the first embodiment in that processing of Step S315 to Step S320 is executed between the processing of Step S015 and the processing of Step S016. A description is given below of the processing of Step S315 to Step S320.

First, the terminal license setting unit 240 generates execution confirmation screen information (Step S315). Specifically, the terminal license setting unit 240 refers to the terminal license information storage unit 263 to identify the service relating to the license to be copied identified in Step S013, the service relating to the license to be moved identified in Step S015, and the service relating to the license not to be copied or moved, and generates screen information for displaying a list of the services and prompting the user to confirm the execution of copying and movement.

Figure 17:
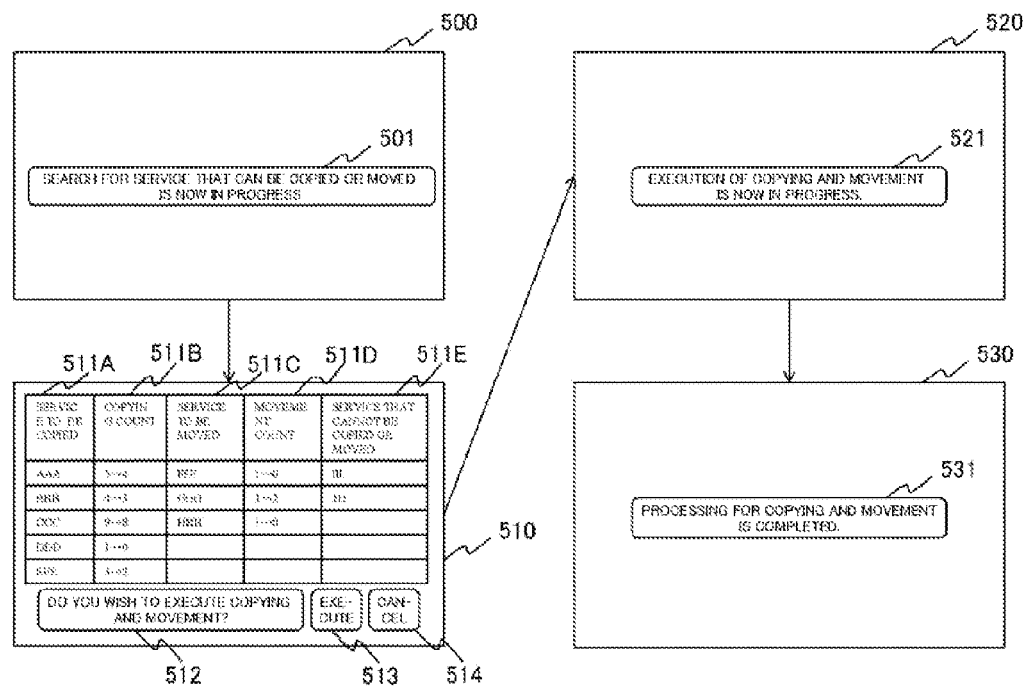
FIG. 17 is a diagram illustrating a display example of a screen in the license setting processing according to the fourth embodiment of the present invention.

FIG. 17 is a diagram illustrating an example of an execution confirmation screen generated in Step S315. The execution confirmation screen is a screen involving a transition of a plurality of screens including a search-in-progress screen 500, a confirmation input screen 510, an execution-in-progress screen 520, and an execution completion screen 530.

The search-in-progress screen 500 is a screen for showing that a search for the service to be copied and the service to be moved is in progress. Specifically, the search-in-progress screen 500 is a screen for displaying a message field 501 for indicating a message such as "SEARCH FOR SERVICE THAT CAN BE COPIED OR MOVED IS NOW IN PROGRESS."

The confirmation input screen 510 is a screen for separately showing the service to be copied, the service to be moved, the service not to be copied or moved, and the like. Specifically, the confirmation input screen 510 includes a copying target field 511A for indicating the service to be copied, a copying count field 511B for indicating a predicted change of the remaining copyable count of each service to be copied, a movement target field 511C for indicating the service to be moved, a movement count field 511D for indicating a predicted change of the remaining movable count of each service to be moved, a non-target field 511E for indicating the service that cannot be copied or moved, a message field 512 for inquiring whether or not to execute the copying and movement, an execution input reception button 513 for receiving an instruction to execute the copying and movement, and a cancel input reception button 514 for receiving an instruction to cancel the execution of the copying and movement.

The execution-in-progress screen 520 is a screen for showing that the execution of the copying and movement is in progress. Specifically, the execution-in-progress screen 520 is a screen for displaying a message field 521 for indicating a message such as "EXECUTION OF COPYING AND MOVEMENT IS NOW IN PROGRESS."

The execution completion screen 530 is a screen for showing that the execution of the copying and movement is completed. Specifically, the execution completion screen 530 is a screen for displaying a message field 531 for indicating a message such as "PROCESSING FOR COPYING AND MOVEMENT IS COMPLETED."

The terminal license setting unit 240 causes the terminal 100 to display the services relating to the license to be copied and the license to be moved and the service relating to the license not to be copied or moved, and waits for a selection input for confirming the execution (Step S316). Specifically, the terminal license setting unit 240 transmits to the terminal 100 the search-in-progress screen 500 and then transmits the confirmation input screen 510.

Then, when the terminal 100 transmits the execution confirmation, that is, when the terminal license setting unit 240 receives an execution request after the terminal 100 receives an input to the execution input reception button 513 (Step S320), the terminal license setting unit 240 causes the terminal 100 to display the execution-in-progress screen 520 and then display the execution completion screen 530.

Note that, when receiving a request to cancel the execution instead of the selection input for confirming the execution after Step S316 (Step S317), the terminal license setting unit 240 terminates the license setting processing (Step S318) and transmits information indicating the termination of the license setting processing to the terminal 100 (Step S319).

The service management system 1000 according to the fourth embodiment is described above. According to the fourth embodiment, it is possible to appropriately confirm in advance whether or not to execute the copying and movement of the license for which the confirmation needs to be made to the user before its execution regarding its setting.

Now, a description is given of a fifth embodiment of the present invention. The fifth embodiment basically has a configuration similar to that of the third embodiment, and hence a description of a common configuration is omitted and what is different from the MOVED embodiment is mainly described below.

Figure 18:
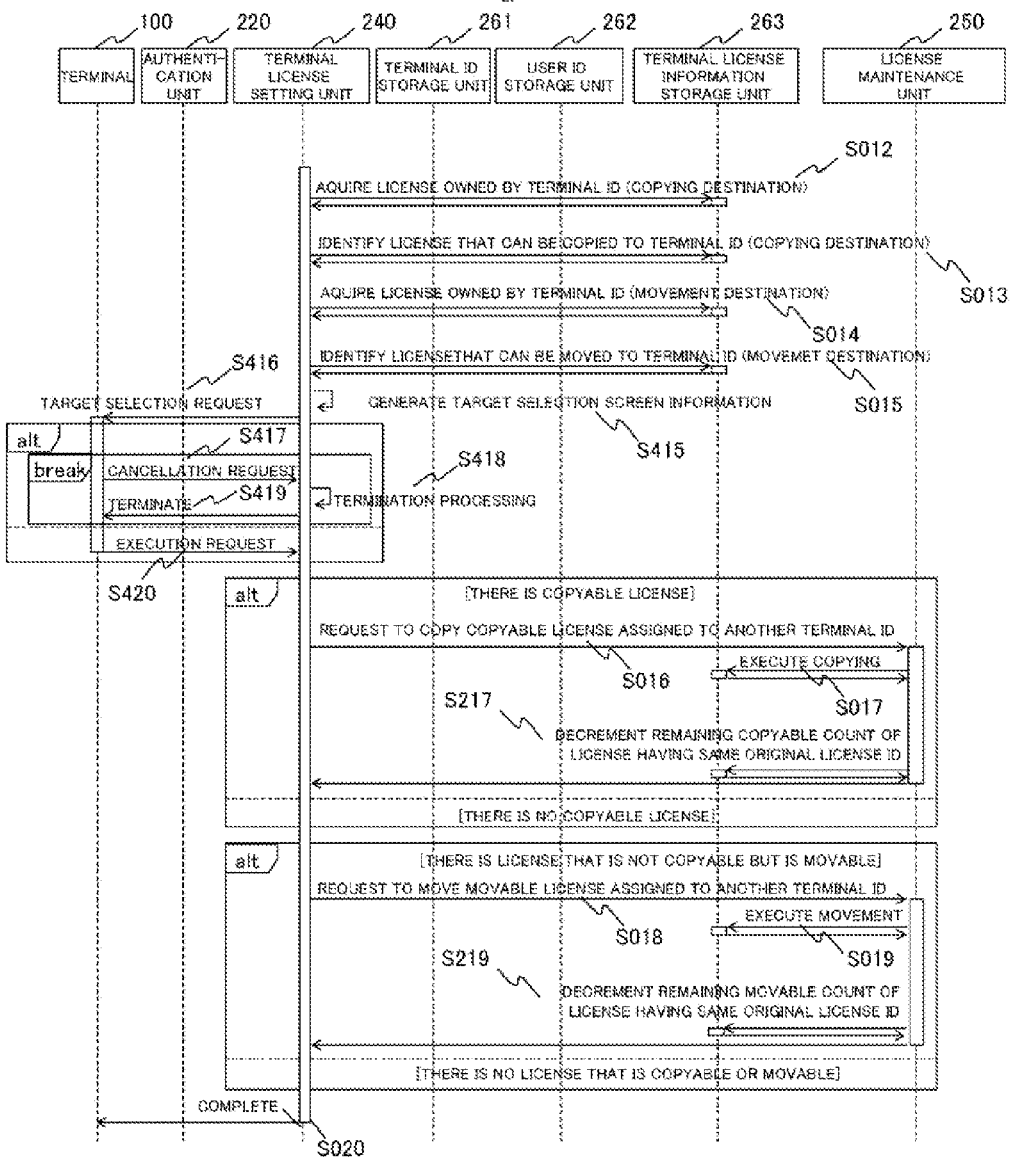
FIG. 18 is a diagram illustrating a flow of a latter half of license setting processing according to a fifth embodiment of the present invention.

FIG. 18 is a sequence diagram illustrating a latter half of license setting processing according to the fifth embodiment of the present invention. This sequence is executed subsequently to the completion of Step S011 of the first half of the license setting processing illustrated in FIG. 8, after the service management apparatus 200 and the terminal 100 are activated.

The license setting processing of the fifth embodiment is different from the license setting processing of the third embodiment in that processing of Step S415 to Step S420 is executed between the processing of Step S015 and the processing of Step S016. A description is given below of the processing of Step S415 to Step S420.

First, the terminal license setting unit 240 generates target selection screen information (Step S415). Specifically, the terminal license setting unit 240 refers to the terminal license information storage unit 263 to identify the service relating to the license to be copied identified in Step S013, the service relating to the license to be moved identified in Step S015, and the service relating to the license not to be copied or moved. The terminal license setting unit 240 then generates screen information for showing, in a list format, the service relating to the license to be copied and the service relating to the license to be moved so as to enable the user to select each of those services.

Figure 19:
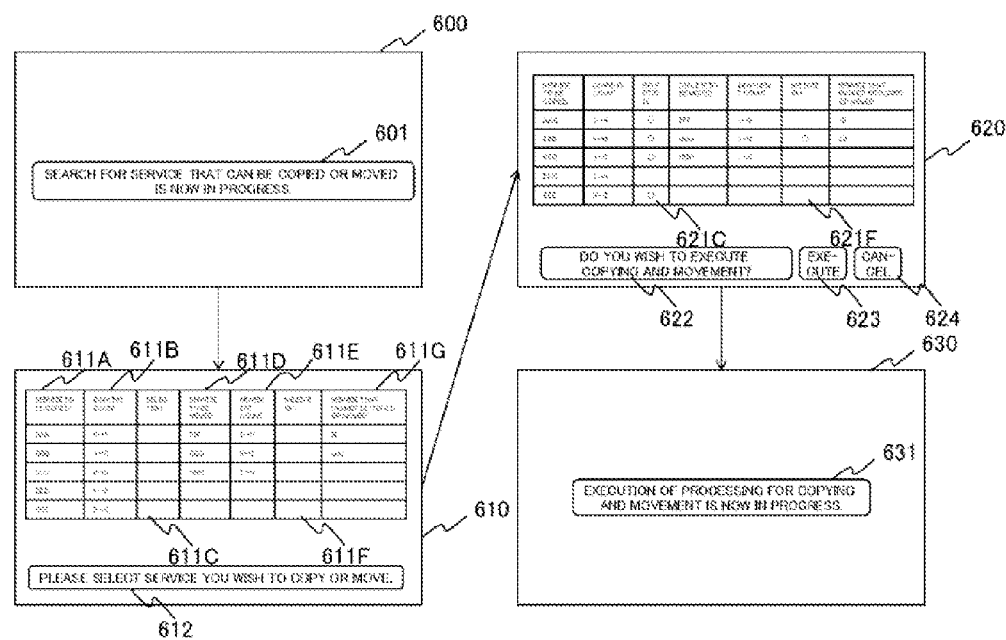
FIG. 19 is a diagram illustrating a display example of a screen in the license setting processing according to the fifth embodiment of the present invention.

FIG. 19 is a diagram illustrating an example of a target selection screen generated in Step S415. The target selection screen is a screen involving a transition of a plurality of screens including a search-in-progress screen 600, a selection input screen 610, an execution instruction screen 620, and an execution-in-progress screen 630.

The search-in-progress screen 600 is a screen for showing that a search for the service to be copied and the service to be moved is in progress. Specifically, the search-in-progress screen 600 is a screen for displaying a message field 601 for indicating a message such as "SEARCH FOR SERVICE THAT CAN BE COPIED OR MOVED IS NOW IN PROGRESS."

The selection input screen 610 is a screen for separately showing the service to be copied, the service to be moved, the service not to be copied or moved, and the like so as to enable the user to select each of those services. Specifically, the selection input screen 610 includes a copying target field 611A for indicating the service to be copied, a copying count field 611B for indicating a predicted change of the remaining copyable count of each service to be copied, a copying selection field 611C for indicating, for each service to be copied, that the service is in a selected state and receiving an input for causing the service to be in the selected state, a movement target field 611D for indicating the service to be moved, a movement count field 611E for indicating a predicted change of the remaining movable count of each service to be moved, a movement selection field 611F for indicating, for each service to be moved, that the service is in a selected state and receiving an input for causing the service to be in the selected state, and a non-target field 611G for indicating the service that cannot be copied or moved.

The execution instruction screen 620 is a screen for receiving an instruction to execute the copying and movement. Specifically, the execution instruction screen 620 includes a field 621C for indicating a selection state of each service to be copied that is input through the selection input screen 610, a field 621F for indicating a selection state of each service to be moved that is input through the selection input screen 610, a message field 622 for inquiring whether or not to execute the copying and movement, an execution input reception button 623 for receiving an instruction to execute the copying and movement, and a cancel input reception button 624 for receiving an instruction to cancel the execution of the copying and movement.

The execution-in-progress screen 630 is a screen for showing that the execution of the copying and movement is in progress. Specifically, the execution-in-progress screen 630 is a screen for displaying a message field 631 for indicating a message such as "EXECUTION OF COPYING AND MOVEMENT IS NOW IN PROGRESS."

The terminal license setting unit 240 causes the terminal 100 to display the services relating to the license to be candidates for copying and the license to be candidates for movement and the service relating to the license not to be candidates for copying or movement, and waits for a selection request for confirming an execution target (Step S416). Specifically, the terminal license setting unit 240 transmits to the terminal 100 the search-in-progress screen 600 and then transmits the selection input screen 610.

Then, when the terminal 100 transmits the execution confirmation, that is, when the terminal license setting unit 240 receives an execution request after the terminal 100 receives an input to the execution input reception button 623 on the execution instruction screen 620 (Step S420), the terminal license setting unit 240 causes the terminal 100 to display the execution-in-progress screen 630.

Note that, when receiving a request to cancel the execution instead of an execution request after Step S416 (Step S417), the terminal license setting unit 240 terminates the license setting processing (Step S418) and transmits information indicating the termination of the license setting processing to the terminal 100 (Step S419).

The service management system 1000 according to the fifth embodiment is described above. According to the fifth embodiment, it is possible to appropriately select whether or not to execute the copying and movement of the license for which a degree of freedom of selection to be given to the user before its execution regarding its setting.

The embodiments of the present invention have been described by taking the first embodiment to the fifth embodiment. According to the service management system 1000 of the present invention, it is possible to finely manage the sharing of the license among the devices depending on the property of the license even when the license is owned by the same user.

In the above-mentioned first to fifth embodiments, the service management apparatus 200 manages the settings of the licenses via the network 150 in a centralized manner, but the present invention is not limited thereto and for example, the following configuration maybe adopted. Specifically, while each of the terminals 100 manages its own license, the service management apparatus 200 collects the license information from the terminal 100 when making the settings so as to check whether or not a maximum license count or the like of the terminal 100 matches that of the service management apparatus 200 and when those counts do not match each other, stops the use of the service that uses the license after a predetermined period of time unless the user matches those counts within the predetermined period of time. With this configuration, it is possible to operate the licenses more flexibly, and to finely make settings of the licenses. For example, it is possible to set the license based on the license of the terminal 100 that is left unused.

A description has been given of the present invention by mainly describing the embodiments. Note that, in each of the above-mentioned embodiments, a description has been given on the assumption that the terminal 100 is the navigation device, but the terminal 100 of the present invention is not limited to the navigation device. The present invention is generally applicable to a service using the license the use of which is limited.

What is claimed is:

1. A service management apparatus, comprising:
a user storage hardware device which stores information for identifying a user and a terminal associated in advance with the user;
a license information storage hardware device which stores a license including the information for identifying the terminal associated in advance with the user, license information for identifying a predetermined service the user is permitted to use on the terminal and license information for identifying a setting limitation on the license;
a setting request reception hardware device which receives a setting request issued by another terminal to set the license, the setting request including information for identifying the another terminal that has issued the setting request and a user of the another terminal;
an associated terminal identification processing hardware device which acquires the information for identifying the another terminal that is associated with the user of the another terminal included in the setting request;
a license identification processing hardware device which identifies a respective license that each terminal is permitted to use and is settable to the another terminal that has issued the setting request, wherein the each terminal is identified by the information acquired by the associated terminal identification processing device;
a license setting processing hardware device which sets the license identified by the license identification processing hardware device to the another terminal that has issued the setting request;
a model-service association information storage hardware device which stores model-service association information including information for identifying a model of the another terminal and information for identifying, for each model, the predetermined service that is available at the each model, wherein
the license information includes, as the setting limitation, information for identifying whether or not the license is copyable and information for identifying whether or not the license is movable,
the license identification processing hardware device determines that the license is settable when the license is at least one of a copyable license and a movable license,
the license setting processing hardware device sets the license to the another terminal by copying the license when the license is copyable irrespective of whether or not the license is movable, and sets the license to the another terminal by moving the license when the license is not copyable but movable,
the license identification processing hardware device determines that the license is not settable when the predetermined service relating to the license is unavailable at the another terminal that has issued the setting request, and
a license of service authenticated by the terminal is moved to the another terminal after the another terminal has issued the setting request, when it is determined that the user has switched from using the terminal to using the another terminal.

2. A service management apparatus according to claim 1, wherein the license information includes an expiration date of the license, and wherein the license identification processing hardware device determines that the license is not settable when the expiration date of the license has passed.

3. A service management apparatus according to claim 1, wherein the license information includes, as the setting limitation, information for identifying a remaining count of copying and information for identifying a remaining count of movement, and
wherein the license setting processing hardware device sets the license to the another terminal by copying the license when the remaining count of copying of the license is at least one irrespective of the remaining count of movement of the license, and sets the license to the another terminal by moving the license when the remaining count of copying of the license is less than one and the remaining count of movement of the license is at least one.

4. A service management apparatus according to claim 1, wherein, when identifying a settable license, the license identification processing hardware device passes a list of services relating to the licenses to be set to the another terminal that has issued the setting request, and
wherein the license setting processing hardware device receives a setting instruction given on the list from the another terminal that has issued the setting request to set the licenses to the another terminal.

5. A service management apparatus according to claim 1, wherein when identifying a settable license, the license identification processing hardware device passes a list of services relating to the licenses to be set to the another terminal that has issued the setting request, and
wherein when receiving, from the another terminal that has issued the setting request, an instruction to set a license that is specified from among the list of the services, the license setting processing hardware device sets the specified license to the another terminal.

6. A non-transitory computer readable storage medium storing a program for causing a computer to execute a method for managing a permission to use a service, the method comprising the steps of:
causing the computer to function as: i) a user storage device which stores information for identifying a user and a terminal associated in advance with the user; ii) a license information storage device which stores a license including information for identifying the terminal associated in advance with the user, license information for identifying a predetermined service the user is permitted to use on the terminal and license information for identifying a setting limitation on the license; and iii) a control device; and
causing the control device to execute: i) a setting request reception step of receiving a setting request issued by another terminal to set the license, the setting request including information for identifying the another terminal that has issued the setting request and a user of the another terminal; ii) an associated terminal identification processing step of acquiring information for identifying the another terminal that is associated with the user of the another terminal included in the setting request; iii) a license identification processing step of identifying a respective license that each terminal is permitted to use and is settable to the another terminal that has issued the setting request, wherein the each terminal is identified by the information acquired by an associated terminal identification processing device; and iv) a license setting processing step of setting the license identified in the license identification processing step to the another terminal that has issued the setting request;

storing, in a model-service association information storage device, model-service association information including information for identifying a model of the another terminal and information for identifying, for each model, the predetermined service that is available at the each model, wherein the license information includes, as the setting limitation, information for identifying whether or not the license is copyable and information for identifying whether or not the license is movable, the license identification processing device determines that the license is settable when the license is at least one of a copyable license and a movable license, the license setting processing device sets the license to the another terminal by copying the license when the license is copyable irrespective of whether or not the license is movable, and sets the license to the another terminal by moving the license when the license is not copyable but movable, the license identification processing device determines that the license is not settable when the predetermined service relating to the license is unavailable at the another terminal that has issued the setting request, and a license of service authenticated by the terminal is moved to the another terminal after the another terminal has issued the setting request, when it is determined that the user has switched from using the terminal to using the another terminal.

7. A service management method for use in a service management apparatus which manages a permission to use a service, the service management method comprising:

a setting request reception step of receiving a setting request from a terminal to set a license including information for identifying the terminal that has issued the setting request and a user of the terminal;

an associated terminal identification processing step of acquiring information for identifying the terminal that is associated with the user included in the setting request;

a license identification processing step of identifying a respective license that each of another terminal and the terminal is permitted to use and is settable to the terminal that has issued the setting request, wherein the each of the another terminal and the terminal is identified by the information acquired by an associated terminal identification processing hardware device;

storing, in a model-service association information storage device, model-service association information including information for identifying a model of the another terminal and information for identifying, for each model, the predetermined service that is available at the each model; and a license setting processing step of setting the license identified in the license identification processing step to the terminal that has issued the setting request, wherein the service management apparatus comprises a user storage hardware device which stores information for identifying the user and the another terminal, which is associated in advance with the user, and a license information storage hardware device which stores the license including information for identifying the another terminal in which the user is permitted to use a predetermined service and license information for identifying a setting limitation on the license, wherein a license of service authenticated by the terminal is moved to the another terminal after the another terminal has issued the setting request, when it is determined that the user has switched from using the terminal to using the another terminal, the license information includes, as the setting limitation, information for identifying whether or not the license is copyable and information for identifying whether or not the license is movable, the license identification processing hardware device determines that the license is settable when the license is at least one of a copyable license and a movable license, the license setting processing hardware device sets the license to the another terminal by copying the license when the license is copyable irrespective of whether or not the license is movable, and sets the license to the another terminal by moving the license when the license is not copyable but movable, and the license identification processing hardware device determines that the license is not settable when the predetermined service relating to the license is unavailable at the another terminal that has issued the setting request.

* * * * *